(12) United States Patent
Kobayashi

(10) Patent No.: US 8,068,485 B2
(45) Date of Patent: Nov. 29, 2011

(54) MULTIMEDIA INTERFACE

(75) Inventor: Osamu Kobayashi, Los Altos, CA (US)

(73) Assignee: Genesis Microchip Inc., Santa Clara, CA (US)

( * ) Notice: Subject to any disclaimer, the term of this patent is extended or adjusted under 35 U.S.C. 154(b) by 896 days.

(21) Appl. No.: 11/747,844

(22) Filed: May 11, 2007

(65) Prior Publication Data

US 2007/0286246 A1 Dec. 13, 2007

Related U.S. Application Data

(63) Continuation-in-part of application No. 10/726,794, filed on Dec. 2, 2003.

(60) Provisional application No. 60/467,804, filed on May 1, 2003, provisional application No. 60/504,060, filed on Sep. 18, 2003, provisional application No. 60/474,085, filed on May 28, 2003, provisional application No. 60/474,084, filed on May 28, 2003.

(51) Int. Cl.
 *H04L 12/28* (2006.01)
(52) U.S. Cl. .................. 370/389; 370/463; 370/546
(58) Field of Classification Search .......... 370/465–474, 370/389, 349, 538, 208, 391, 395.4, 540, 370/539, 395.62, 546; 345/204, 208, 210, 345/213, 214, 690, 691, 699, 99, 3.1–3.4
See application file for complete search history.

(56) References Cited

U.S. PATENT DOCUMENTS

| | | |
|---|---|---|
| 4,479,142 A | 10/1984 | Buschman et al. |
| 4,796,203 A | 1/1989 | Roberts |
| 4,868,557 A | 9/1989 | Perlman |
| 5,007,050 A | 4/1991 | Kasparian et al. |
| 5,245,612 A | 9/1993 | Kachi et al. |
| 5,258,983 A | 11/1993 | Lane et al. |
| 5,369,775 A | 11/1994 | Yamasaki et al. |
| 5,425,101 A | 6/1995 | Woo et al. |
| 5,515,296 A | 5/1996 | Agarwal |
| 5,541,919 A | 7/1996 | Yong et al. |
| 5,608,418 A | 3/1997 | McNally |
| 5,615,376 A | 3/1997 | Ranganathan |
| 5,625,379 A | 4/1997 | Reinert et al. |

(Continued)

FOREIGN PATENT DOCUMENTS

CN 1353513 6/2002

(Continued)

OTHER PUBLICATIONS

"Interfacing the Serial I/0 to an I2C Peripheral", Fujitsu Microelectronics, Inc., p. 1, 4 and 7.*

(Continued)

*Primary Examiner* — Kwang B Yao
*Assistant Examiner* — Kenan Cehic
(74) *Attorney, Agent, or Firm* — Beyer Law Group LLP

(57) ABSTRACT

A packet based display interface having a video processing unit arranged to couple a multimedia source device to a multimedia sink device is disclosed that includes a transmitter unit coupled to the source device arranged to receive a source packet data stream in accordance with a native stream rate, a receiver unit coupled to the sink device, and a linking unit coupling the transmitter unit and the receiver unit arranged to transfer a multimedia data packet stream formed of a number of multimedia data packets based upon the source packet data stream in accordance with a link rate between the transmitter unit and the receiver unit.

21 Claims, 36 Drawing Sheets

U.S. PATENT DOCUMENTS

| | | | |
|---|---|---|---|
| 5,629,715 | A | 5/1997 | Zenda |
| 5,670,973 | A | 9/1997 | Bassetti, Jr. et al. |
| 5,739,803 | A | 4/1998 | Neugebauer |
| 5,745,837 | A | 4/1998 | Fuhrmann |
| 5,790,083 | A | 8/1998 | Bassetti |
| 5,801,776 | A | 9/1998 | Tamura et al. |
| 5,805,173 | A | 9/1998 | Glennon et al. |
| 5,835,498 | A | 11/1998 | Kim et al. |
| 5,835,730 | A | 11/1998 | Grossman et al. |
| 5,838,875 | A | 11/1998 | Cho et al. |
| 5,852,630 | A | 12/1998 | Langberg et al. |
| 5,887,039 | A | 3/1999 | Suemura et al. |
| 5,909,465 | A | 6/1999 | Bottomley et al. |
| 5,918,002 | A | 6/1999 | Klemets et al. |
| 5,926,155 | A | 7/1999 | Arai et al. |
| 5,940,070 | A | 8/1999 | Koo |
| 5,940,137 | A | 8/1999 | Hulvey |
| 5,949,437 | A | 9/1999 | Clark |
| 6,005,613 | A | 12/1999 | Endsley et al. |
| 6,005,861 | A | 12/1999 | Humpleman |
| 6,020,901 | A | 2/2000 | Lavelle et al. |
| 6,026,179 | A | 2/2000 | Brett |
| 6,038,000 | A | 3/2000 | Hurst, Jr. |
| 6,049,316 | A | 4/2000 | Nolan et al. |
| 6,049,769 | A | 4/2000 | Holmes et al. |
| 6,069,929 | A | 5/2000 | Yabe et al. |
| 6,151,334 | A | 11/2000 | Kim et al. |
| 6,151,632 | A | 11/2000 | Chaddha et al. |
| 6,154,225 | A | 11/2000 | Kou et al. |
| 6,172,988 | B1 | 1/2001 | Tiernan et al. |
| 6,175,573 | B1 | 1/2001 | Togo et al. |
| 6,177,922 | B1 | 1/2001 | Schiefer et al. |
| 6,219,736 | B1 | 4/2001 | Klingman |
| 6,223,089 | B1 | 4/2001 | Page |
| 6,249,319 | B1 | 6/2001 | Post |
| 6,326,961 | B1 | 12/2001 | Lin et al. |
| 6,330,605 | B1 | 12/2001 | Christensen et al. |
| 6,337,964 | B2 | 1/2002 | Inami et al. |
| 6,353,594 | B1 | 3/2002 | Tooker et al. |
| 6,356,260 | B1 | 3/2002 | Montalbo |
| 6,437,768 | B1 | 8/2002 | Kubota et al. |
| 6,441,857 | B1 | 8/2002 | Wicker et al. |
| 6,446,130 | B1 | 9/2002 | Grapes |
| 6,477,252 | B1 | 11/2002 | Faber et al. |
| 6,490,705 | B1 | 12/2002 | Boyce |
| 6,542,967 | B1 | 4/2003 | Major |
| 6,543,053 | B1 | 4/2003 | Li et al. |
| 6,545,688 | B1 | 4/2003 | Loveridge et al. |
| 6,577,303 | B2 | 6/2003 | Kim |
| 6,585,431 | B1* | 7/2003 | Okamoto .................. 398/131 |
| 6,587,480 | B1 | 7/2003 | Higgins et al. |
| 6,598,161 | B1 | 7/2003 | Kluttz et al. |
| 6,600,469 | B1 | 7/2003 | Nukiyama et al. |
| 6,608,828 | B1 | 8/2003 | Balachandran |
| 6,614,800 | B1 | 9/2003 | Genty et al. |
| 6,661,422 | B1 | 12/2003 | Valmiki et al. |
| 6,693,895 | B1* | 2/2004 | Crummey et al. ............ 370/352 |
| 6,697,376 | B1 | 2/2004 | Son et al. |
| 6,704,310 | B1 | 3/2004 | Zimmermann et al. |
| 6,765,931 | B1 | 7/2004 | Rabenko et al. |
| 6,778,168 | B2 | 8/2004 | Mamiya et al. |
| 6,801,711 | B1 | 10/2004 | Kim et al. |
| 6,862,606 | B1 | 3/2005 | Major et al. |
| 6,865,188 | B1 | 3/2005 | Stirling et al. |
| 6,873,625 | B1 | 3/2005 | Yoo et al. |
| 6,874,118 | B1 | 3/2005 | Pirzadeh et al. |
| 6,903,716 | B2 | 6/2005 | Kawabe et al. |
| 6,907,067 | B1 | 6/2005 | Moeller et al. |
| 6,909,442 | B2 | 6/2005 | Hiyama et al. |
| 6,914,637 | B1* | 7/2005 | Wolf et al. .................. 348/473 |
| 6,963,968 | B2 | 11/2005 | Kori |
| 6,973,069 | B1 | 12/2005 | Spear et al. |
| 6,975,645 | B1 | 12/2005 | Suzuki et al. |
| 7,006,506 | B1 | 2/2006 | Naik |
| 7,046,631 | B1 | 5/2006 | Giroux et al. |
| 7,075,987 | B2 | 7/2006 | Kim et al. |
| 7,099,277 | B2 | 8/2006 | Sahinoglu et al. |
| 7,136,415 | B2 | 11/2006 | Yun et al. |
| 7,177,329 | B2 | 2/2007 | Kobayashi et al. |
| 7,194,554 | B1 | 3/2007 | Short et al. |
| 7,248,590 | B1 | 7/2007 | Liu |
| 7,256,790 | B2 | 8/2007 | Valmiki et al. |
| 7,295,578 | B1 | 11/2007 | Lyle et al. |
| 7,348,957 | B2 | 3/2008 | Cui et al. |
| 7,453,479 | B2 | 11/2008 | Le et al. |
| 7,525,975 | B2 | 4/2009 | Caspi et al. |
| 2001/0014936 | A1* | 8/2001 | Jinzaki .................. 711/221 |
| 2001/0019560 | A1 | 9/2001 | Yamashita |
| 2001/0030649 | A1 | 10/2001 | Mamiya et al. |
| 2001/0036193 | A1 | 11/2001 | Kori |
| 2001/0038387 | A1 | 11/2001 | Tomooka et al. |
| 2001/0052011 | A1 | 12/2001 | Nagao |
| 2002/0007452 | A1 | 1/2002 | Traw et al. |
| 2002/0011996 | A1 | 1/2002 | Inoue et al. |
| 2002/0036631 | A1 | 3/2002 | Perez |
| 2002/0054420 | A1 | 5/2002 | Fergusson |
| 2002/0060676 | A1 | 5/2002 | Kim |
| 2002/0061024 | A1 | 5/2002 | Malkemes et al. |
| 2002/0062394 | A1 | 5/2002 | Bunn et al. |
| 2002/0071055 | A1 | 6/2002 | Ooshima et al. |
| 2002/0071390 | A1 | 6/2002 | Reeves et al. |
| 2002/0075250 | A1 | 6/2002 | Shigeta et al. |
| 2002/0075902 | A1 | 6/2002 | Abbas et al. |
| 2002/0080468 | A1 | 6/2002 | Crummey et al. |
| 2002/0085582 | A1 | 7/2002 | Kim |
| 2002/0089517 | A1 | 7/2002 | Ludtke et al. |
| 2002/0122515 | A1 | 9/2002 | Bodenschatz |
| 2002/0136219 | A1 | 9/2002 | Ding et al. |
| 2002/0149617 | A1 | 10/2002 | Becker |
| 2002/0163598 | A1 | 11/2002 | Pasqualino |
| 2002/0164022 | A1 | 11/2002 | Strasser et al. |
| 2002/0184327 | A1 | 12/2002 | Major et al. |
| 2002/0190974 | A1 | 12/2002 | Morita |
| 2002/0190978 | A1 | 12/2002 | Agarwal et al. |
| 2003/0035442 | A1 | 2/2003 | Eng |
| 2003/0048852 | A1 | 3/2003 | Hwang et al. |
| 2003/0056051 | A1* | 3/2003 | Burke et al. .................. 710/302 |
| 2003/0063077 | A1 | 4/2003 | Koyama |
| 2003/0067552 | A1 | 4/2003 | Leyvi et al. |
| 2003/0067558 | A1 | 4/2003 | Shintani et al. |
| 2003/0076282 | A1 | 4/2003 | Ikeda et al. |
| 2003/0080971 | A1 | 5/2003 | Hochmuth et al. |
| 2003/0112822 | A1 | 6/2003 | Hong et al. |
| 2003/0138102 | A1 | 7/2003 | Kohn et al. |
| 2003/0145258 | A1 | 7/2003 | Warner et al. |
| 2003/0149987 | A1 | 8/2003 | Pasqualino et al. |
| 2003/0152160 | A1 | 8/2003 | Bauch et al. |
| 2003/0174022 | A1 | 9/2003 | Zamir et al. |
| 2003/0174156 | A1 | 9/2003 | Katsuhara et al. |
| 2003/0174795 | A1 | 9/2003 | Bruhnke et al. |
| 2003/0177423 | A1 | 9/2003 | Komatsu et al. |
| 2003/0212811 | A1 | 11/2003 | Thornton |
| 2003/0220026 | A1 | 11/2003 | Oki et al. |
| 2004/0022204 | A1 | 2/2004 | Trembley |
| 2004/0049705 | A1 | 3/2004 | Liebenow |
| 2004/0059852 | A1* | 3/2004 | Sun et al. .................. 710/110 |
| 2004/0068744 | A1 | 4/2004 | Claussen et al. |
| 2004/0080523 | A1 | 4/2004 | Myers |
| 2004/0080671 | A1 | 4/2004 | Siemens et al. |
| 2004/0081151 | A1 | 4/2004 | Greis et al. |
| 2004/0088469 | A1 | 5/2004 | Levy |
| 2004/0100583 | A1 | 5/2004 | Yoneno |
| 2004/0103333 | A1 | 5/2004 | Martwick et al. |
| 2004/0114607 | A1 | 6/2004 | Shay et al. |
| 2004/0150928 | A1* | 8/2004 | Goodfellow et al. ............ 361/90 |
| 2004/0179593 | A1 | 9/2004 | Goldstein et al. |
| 2004/0198386 | A1 | 10/2004 | Dupray |
| 2004/0199565 | A1 | 10/2004 | Visharam et al. |
| 2004/0203383 | A1 | 10/2004 | Kelton et al. |
| 2004/0207625 | A1* | 10/2004 | Griffin et al. .................. 345/440 |
| 2004/0210805 | A1 | 10/2004 | Kimelman et al. |
| 2004/0218598 | A1 | 11/2004 | Kobayashi |
| 2004/0218599 | A1 | 11/2004 | Kobayashi |
| 2004/0218624 | A1 | 11/2004 | Kobayashi |
| 2004/0218625 | A1 | 11/2004 | Kobayashi |
| 2004/0218627 | A1 | 11/2004 | Kobayashi |
| 2004/0221056 | A1 | 11/2004 | Kobayashi |

| | | | |
|---|---|---|---|
| 2004/0221180 | A1 | 11/2004 | Enami et al. |
| 2004/0221312 | A1 | 11/2004 | Kobayashi |
| 2004/0221315 | A1 | 11/2004 | Kobayashi |
| 2004/0228365 | A1 | 11/2004 | Kobayashi |
| 2004/0233181 | A1 | 11/2004 | Kobayashi |
| 2004/0240454 | A1 | 12/2004 | Yamauchi et al. |
| 2004/0243905 | A1 | 12/2004 | Merritt |
| 2005/0062699 | A1 | 3/2005 | Kobayashi |
| 2005/0062711 | A1 | 3/2005 | Kobayashi |
| 2005/0066085 | A1 | 3/2005 | Kobayashi |
| 2005/0103333 | A1 | 5/2005 | Bonutti |
| 2005/0157714 | A1 | 7/2005 | Shlissel et al. |
| 2005/0204077 | A1* | 9/2005 | Kou .................................. 710/36 |
| 2005/0216731 | A1 | 9/2005 | Saito et al. |
| 2005/0225547 | A1 | 10/2005 | Choi |
| 2005/0249212 | A1 | 11/2005 | Schoner |
| 2006/0015299 | A1 | 1/2006 | McDermott et al. |
| 2006/0036788 | A1 | 2/2006 | Galang et al. |
| 2006/0059092 | A1 | 3/2006 | Burshan et al. |
| 2006/0117371 | A1 | 6/2006 | Margulis |
| 2006/0133386 | A1 | 6/2006 | McCormack et al. |
| 2006/0209890 | A1 | 9/2006 | MacMullan et al. |
| 2006/0258216 | A1* | 11/2006 | Konda ............................ 439/607 |
| 2006/0271979 | A1 | 11/2006 | Hejna, Jr. |
| 2006/0277589 | A1* | 12/2006 | Margis et al. .................. 725/135 |
| 2007/0019684 | A1 | 1/2007 | Zimmermann |
| 2007/0049086 | A1 | 3/2007 | Sakane |
| 2007/0091815 | A1 | 4/2007 | Tinnakornsrisuphap et al. |
| 2007/0097885 | A1 | 5/2007 | Traversat et al. |
| 2007/0140298 | A1 | 6/2007 | Eng |
| 2008/0022023 | A1 | 1/2008 | Kim et al. |
| 2008/0062201 | A1 | 3/2008 | Bhatia et al. |
| 2008/0091439 | A1 | 4/2008 | Baumgarte et al. |
| 2008/0126824 | A1 | 5/2008 | Lee et al. |
| 2008/0175277 | A1 | 7/2008 | Yin et al. |
| 2008/0284761 | A1 | 11/2008 | Knee et al. |

FOREIGN PATENT DOCUMENTS

| | | |
|---|---|---|
| EP | 0 354 480 A | 2/1990 |
| EP | 0 385 449 A1 | 9/1990 |
| EP | 0 674 440 A2 | 9/1995 |
| EP | 0 674 441 A1 | 9/1995 |
| EP | 078 8048 | 6/1997 |
| EP | 1 041 823 A2 | 10/2000 |
| EP | 1 069 721 A2 | 1/2001 |
| EP | 1 089 503 | 4/2001 |
| EP | 1 154 354 A | 11/2001 |
| EP | 1 229 690 A | 8/2002 |
| EP | 1 251 664 A2 | 10/2002 |
| EP | 1 432 203 | 6/2004 |
| EP | 1 473 700 | 11/2004 |
| EP | 1 517 292 A2 | 3/2005 |
| EP | 1 519 349 A2 | 3/2005 |
| EP | 1 519 581 A1 | 3/2005 |
| EP | 1 628 446 | 2/2006 |
| GB | 2 329 741 A | 3/1999 |
| JP | 03-153299 | 7/1991 |
| JP | 10145309 | 5/1998 |
| JP | 11175045 | 7/1999 |
| JP | 2001 218082 | 8/2001 |
| JP | 2001036900 | 9/2001 |
| JP | 2002 304168 | 10/2002 |
| SG | 110144 | 4/2005 |
| WO | WO95/00917 | 1/1995 |
| WO | WO 95/13681 | 5/1995 |
| WO | WO 98/41008 | 9/1998 |
| WO | WO 99/63513 | 12/1999 |
| WO | WO00/20974 | 4/2000 |
| WO | WO 02/25822 A2 | 3/2002 |
| WO | WO02/25885 | 3/2002 |
| WO | WO02/065746 | 8/2002 |
| WO | WO 03/058376 | 7/2003 |

OTHER PUBLICATIONS

Notice of Allowance dated Jan. 29, 2008 in U.S. Appl. No. 10/726,802.
Notice of Allowance dated Mar. 5, 2008 in U.S. Appl. No. 10/909,103.
Sung et al., "DVI: A standard for the digital monitor interface," Silicon Image, Inc., Cupertino, CA, 1999, 4 pgs.
Eidson et al., "30.2: HDMI: High-Definition Multimedia Interface," Silicon Image, Inc., Sunnyvale, CA, SID 03 Digest, 2003, pp. 1024-1027.
European Search Report dated Mar. 13, 2008 in EP Application No. 04251582.5.
High-Definition Multimedia Interface Specification, Informational Version 1.0, Sep. 4, 2003, 52 pgs.
European Search Report dated Mar. 13, 2008 in EP Application No. 04252056.9.
Office Action dated Jan. 23, 2008 from U.S. Appl. No. 11/747,839.
European Search Report dated Mar. 28, 2008 in EP Application No. 04252054.4.
Silicon Image, "High-bandwidth Digital Content Protection," White Paper, Feb. 2000, retrieved from the Internet at http://www.siliconimage.com/docs/SiI-WP-002-A.pdf.
Chinese Office Action dated Mar. 28, 2008 in Chinese application No. 200410044503.5.
European Search Report dated Mar. 28, 2008 from EP Application No. 04252203.7.
European Search Report dated Mar. 18, 2008 from EP Application No. 04252202.9.
Austrian Search Report dated Mar. 7, 2008 from Singapore Application No. 200401969-1.
Austrian Examination Report dated Mar. 7, 2008 from Singapore Application No. 200401969-1.
European Search Report dated Mar. 28, 2008 from EP Application No. 04252057.7.
European Search Report dated Apr. 3, 2008 from EP Application No. 04252205.2.7.
Office Action dated Apr. 9, 2008 from U.S. Appl. No. 10/909,027.
Office Action mailed Nov. 26, 2007 from U.S. Appl. No. 10/909,027.
Office Action mailed Dec. 28, 2007 from U.S. Appl. No. 10/726,895.
Office Action dated Jan. 8, 2008 in U.S. Appl. No. 10/762,680.
Office Action dated Nov. 2, 2007 from Chinese Patent Application No. 2004100950502.4.
Notice of Allowance dated Apr. 25, 2008 from U.S. Appl. No. 10/726,802.
Office Action dated Mar. 31, 2008 from U.S. Appl. No. 10/726,794.
Office Action mailed Jun. 27, 2007 from U.S. Appl. No. 10/726,794.
Bloks, RHJ, "The IEEE-1934 high speed serial bus," Philips Journal of Research, Elsevier, Amsterdam, NL, vol. 50, No. 1, 1996, pp. 209-216, XP004008212 ISSN: 0165-5817.
Chang et al., "Digital Visual Interface," Technology Brief, Dell, May 2000.
"CLUT," http://en.wikipedia.org/wiki/CLUT.
"Digital Visual Interface (DVI), Revision 1.0," Apr. 2, 1999, http://wwwddwg.org/lib/dvi_10.pdf, Figures 2-1, 3-1, 4-1; sections 1.32, 2.1, 2.2.5, 2.6, 3.1.4, 3.3, 4.1; pp. 8, 10, 14-15, 23-25, 30-31, 33-34.
Jun Hanari and Manabu Watanabe et al., "15.2: Development of an UXGA Display System by a Digital Packet Video Link," SID 01 Digest, vol. XXXII, Jun. 5, 2001, pp. 210-213, XP007007646, paragraphs 0001-0003.
Kasai N et al., "Digital Packet Video Link 1-9 for Super High Resolution Display," IEICE Transactions on Electronics, Electronics Society, Tokyo, JP, vol. E84-C, No. 11, Nov. 2001, pp. 1630-1636, XP001110772, ISSN: 0916-8524, paragraphs 0001, 0002.
"Packet," http://en.wikipedia.org/wiki/Packet.
Wickelgren, IJ, "The Facts About Firewire," IEEE Spectrum, IEEE Inc., New York, US, vol. 34, No. 4, Apr. 1997, pp. 19-25, XP002051393, ISSN: 0018-9235.
Office Action mailed Aug. 5, 2005 from U.S. Appl. No. 10/726,934.
Office Action mailed Aug. 9, 2005 from U.S. Appl. No. 10/726,438.
Office Action mailed Aug. 9, 2005 from U.S. Appl. No. 10/727,131.
Office Action mailed Nov. 1, 2005 from U.S. Appl. No. 10/726,438.
Office Action mailed Nov. 1, 2005 from U.S. Appl. No. 10/727,131.
Office Action mailed Nov. 2, 2005 from U.S. Appl. No. 10/726,802.
Office Action mailed Dec. 5, 2006 from U.S. Appl. No. 10/726,802.
International Search Report dated Mar. 15, 2006 from European Patent Application No. 04255610.0.
International Search Report dated Jun. 14, 2006 from European Patent Application No. 04252055.1.

Examination Report dated Jul. 5, 2006 from European Patent Application No. 04255611.8.
Examination Report dated Nov. 13, 2006 from European Patent Application No. 04255609.2.
Austrian Search and Exam Report dated Feb. 16, 2007 issued in corresponding Singapore Application No. 200401973-3.
International Search Report in related Chinese Application No. 200410044503.5 dated Jun. 29, 2007.
High-bandwidth Digital Content Protection System, Revision 1.0, Intel Corporation, Feb. 17, 2000.
EPO Exam Report in EP Application No. 04255786.8 dated Jul. 5, 2007.
Office Action mailed Jun. 26, 2007 from U.S. Appl. No. 10/762,680.
Office Action mailed Jul. 9, 2007 from U.S. Appl. No. 10/726,895.
Search Report dated Jul. 2, 2008 in EP Application No. 08155263.0.
Search Report dated Jun. 30, 2008 in EP Application No. 08155262.2.
Notice of Allowance dated Oct. 1, 2008 in U.S. Appl. No. 10/909,085.
Office Action dated Oct. 16, 2008 in U.S. Appl. No. 10/909,027.
Notice of Allowance dated Oct. 21, 2008 in U.S. Appl. No. 10/762,680.
Office Action dated Jun. 24, 2008 from U.S. Appl. No. 10/726,794.
Chinese Office Action dated Apr. 4, 2008 in Chinese Application No. 200410047784.X.
Examination Report dated Jun. 5, 2008 from European Patent Application No. 04252057.7.
Examination Report dated Jun. 5, 2008 from European Patent Application No. 04251581.7.
Examination Report dated Jun. 5, 2008 from European Patent Application No. 04252202.9.
Office Action dated Jun. 23, 2008 from U.S. Appl. No. 10/762,680.
Examination Report dated Jun. 5, 2008 from European Patent Application No. 04252056.9.
Examination Report dated Jun. 5, 2008 from European Patent Application No. 04252054.4.
Examination Report dated Jun. 5, 2008 from European Patent Application No. 04252203.7.
Chinese Office Action dated Jun. 27, 2008 from Chinese Patent Application No. 200410038432.8.
Office Action dated Jun. 27, 2008 from U.S. Appl. No. 10/909,085.
Office Action dated Aug. 1, 2008 in U.S. Appl. No. 10/909,027.
Chinese Office Action dated Jun. 27, 2008 in Chinese Application No. 200410038546.2.
Search Report dated Jul. 21, 2008 from European Patent Application No. 08153724.3.
Search Report dated Jul. 10, 2008 from European Patent Application No. 08153726.8.
Kobayashi, "DisplayPort Technical Overview," http://web.archive.org/web/20060726222849/http://gnss.com/technology/DisplayPort+Technical+Overview+White+Paper.pdf, Jun. 26, 2006.
Office Action dated Jul. 4, 2008 from Chinese Patent Application No. 200410038545.8.
Office Action dated Jul. 2, 2008 from European Patent Application No. 04252205.2.
Office Action dated May 23, 2008 from Chinese Patent Application No. 200410071498.7.
Office Action dated Aug. 8, 2008 from Chinese Patent Application No. 200410045686.2.
Office Action dated Aug. 8, 2008 from Chinese Patent Application No. 200410087460.9.
VESA Display Port Standard, Version 1.1, Mar. 19, 2007.
Office Action dated Aug. 6, 2008 from U.S. Appl. No. 10/726,895.
Office Action dated Aug. 19, 2008 from U.S. Appl. No. 10/726,440.
Office Action dated Aug. 29, 2008 from U.S. Appl. No. 11/742,387.
Final Rejection mailed Sep. 21, 2007 from U.S. Appl. No. 10/909,103.
Notice of Allowance mailed Sep. 24, 2007 from U.S. Appl. No. 10/726,802.
Supplemental Notice of Allowance mailed Nov. 6, 2007 from U.S. Appl. No. 10/726,802.
Office Action mailed Nov. 27, 2007 from U.S. Appl. No. 10/726,794.
Notice of Allowance dated May 21, 2010 in U.S. Appl. No. 10/909,027.
Office Action dated Jun. 23, 2010 in U.S. Appl. No. 11/776,411.
Office Action dated Jun. 11, 2010 in U.S. Appl. No. 11/740,859.
Office Action dated Mar. 31, 2010 in U.S. Appl. No. 11/776,411.
Bernard Sklar, "Digital Communications, Fundamentals and Applications," $2^{nd}$ Edition, Prentice Hall PTR, pp. 14-15.
Office Action dated Mar. 9, 2010 in U.S. Appl. No. 10/726,794.
Office Action dated Mar. 9, 2010 in U.S. Appl. No. 10/909,027.
Office Action dated Feb. 19, 2010 in U.S. Appl. No. 10/726,441.
Office Action dated Nov. 23, 2009 in U.S. Appl. No. 11/742,222.
Notice of Allowance dated Dec. 31, 2009 in U.S. Appl. No. 10/726,895.
Office Action dated Nov. 12, 2009 in U.S. Appl. No. 10/726,350.
Office Action dated Feb. 6, 2009 from Chinese Patent Application No. 200410038545.8.
Office Action dated Jan. 6, 2010 in U.S. Appl. No. 11/740,859.
Office Action dated Sep. 11, 2009 in U.S. Appl. No. 10/726,441.
Office Action dated Apr. 3, 2009 in CN Patent Application No. 200410044503.5.
Notice of Allowance dated Jun. 25, 2009 in U.S. Appl. No. 11/747,839.
Notice of Allowance dated Jul. 8, 2009 in U.S. Appl. No. 10/726,440.
Office Action dated Sep. 10, 2009 in U.S. Appl. No. 10/909,027.
Office Action dated Sep. 17, 2009 in U.S. Appl. No. 10/726,794.
Universal Serial Bus Specification, Revision 2.0, Apr. 27, 2000, p. 143.
Universal Serial Bus Specification, Revision 2.0, Apr. 27, 2000, pp. 7, 19, 32-34, 36, 38, 39, 43, 44, 48-51, 58, 66, 67, 72-74, 85, 86, 132, 206-209, 228, 229, 242-244, 269, 270, 278.
Fairhurst, MPEG-2 Transmission, Jan. 2001, pp. 1-9 from Internet at http://www.erg.abdn.ac.uk/research/future-net/digital-video/mpeg2-trans.html.
Office Action dated May 14, 2009 in U.S. Appl. No. 10/726,895.
Office Action dated Sep. 21, 2009 in U.S. Appl. No. 10/726,895.
Barr, "Copy Protection for High-Definition Baseband Video," Information Technology: Coding and Computing [online at http://ieeexplore.ieee.org/stamp/stamp.jsp?arnumber=844202&isnumber=18266, Aug. 6, 2002.
Office Action dated Oct. 21, 2008 from U.S. Appl. No. 11/747,839.
Office Action dated Oct. 31, 2008 in Chinese Patent Application No. 200410095171.3.
Chinese Office Action dated Nov. 28, 2008 in CN Application No. 200410071497.2.
Office Action dated Jan. 5, 2009 in U.S. Appl. No. 10/726,440.
Notice of Allowance dated Jan. 7, 2009 in U.S. Appl. No. 11/742,387.
Office Action dated Mar. 3, 2009 in U.S. Appl. No. 10/726,440.
Office Action dated Mar. 4, 2009 in U.S. Appl. No. 10/726,350.
Office Action dated Mar. 6, 2009 in CN Patent Application No. 200410043419.1.
Office Action dated Mar. 13, 2009 in CN Patent Application No. 200410095171.3.
Search Report dated Apr. 2, 2009 in EP Application No. 08153454.7.
Office Action dated Apr. 2, 2009 in U.S. Appl. No. 10/726,794.
Office Action dated Apr. 6, 2009 in U.S. Appl. No. 10/909,027.
Office Action dated May 26, 2009 in U.S. Appl. No. 11/742,222.
Office Action dated Apr. 4, 2008 in CN Patent Application No. 200410043419.1.
Office Action dated Sep. 12, 2008 in CN Patent Application No. 200410044503.5.
Office Action dated Oct. 8, 2009 in U.S. Appl. No. 11/776,411.
Office Action dated Jan. 11, 2010 in U.S. Appl. No. 12/137,458.
Office Action dated Nov. 29, 2010 in U.S. Appl. No. 11/740,859.
Office Action dated Nov. 26, 2010 in U.S. Appl. No. 11/776,411.
European Search Report dated Sep. 22, 2010 in EP Application No. 10162586.1.
Lei et al., "Adaptive Video Transcoding and Streaming Over Wireless Channels," The Journal of Systems and Software 75 (2005) 253-270.
Office Action dated Jun. 6, 2011, in U.S. Appl. No. 11/740,859.
Office Action dated Apr. 1, 2011 in U.S. Appl. No. 11/776,411.
Final Office Action dated Feb. 23, 2011 from U.S. Appl. No. 12/610,928.

* cited by examiner

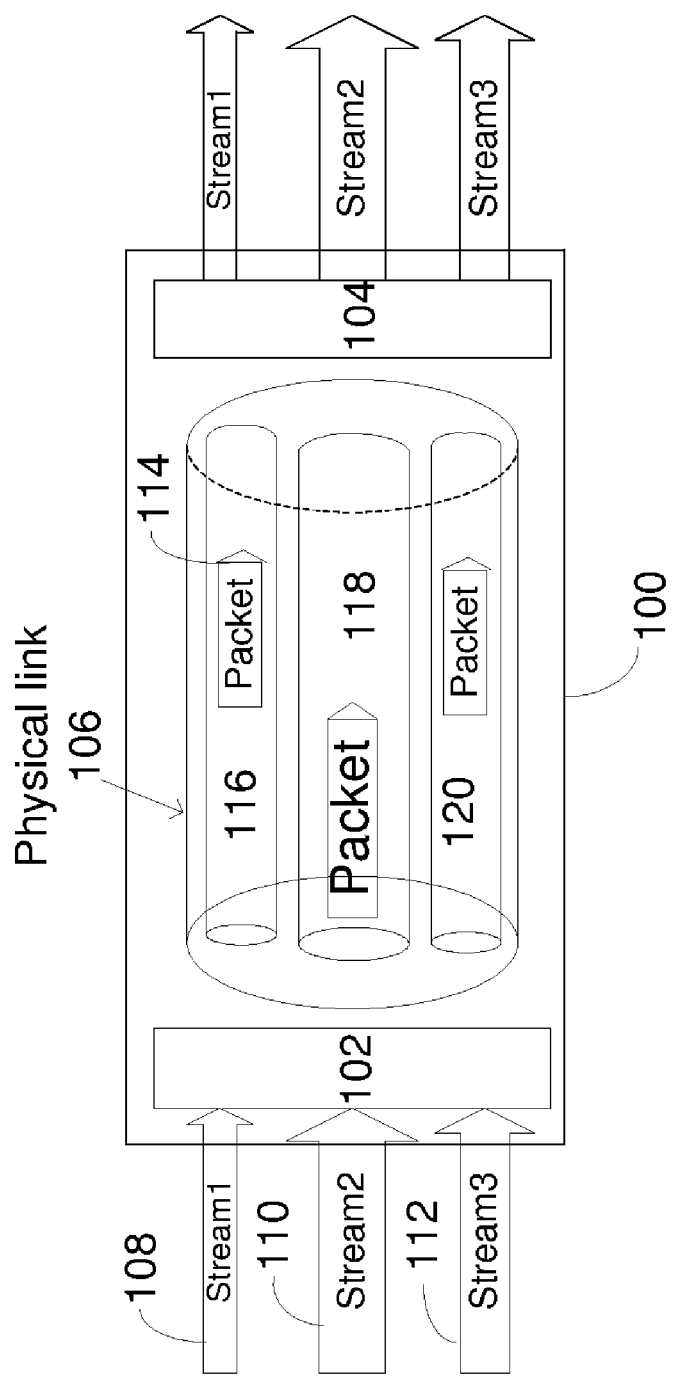

Main Link Data Rates

| Nominal Baud Rate per channel (Gbits/second) | Actual Baud Rate per channel (Gbits/second) | Clock Multiplication Factor from 24-MHz crystal |
|---|---|---|
| 1.0 | 0.960 | x40 |
| 1.35 | 1.344 | x56 |
| 1.7 | 1.728 | x72 |
| 2.1 | 2.112 | x88 |
| 2.5 | 2.496 | x104 |

Fig. 3

Main Link Packet Format

High-level diagram of link traffic example with three streams n = null

| SID = 1 | 0 | 0 | 0 | 0 | CRC | TSP19-16 | PHI |
|---|---|---|---|---|---|---|---|
| Sub-packet Header 902 | | | | | | Sub-packet Header 902 | SPS 904 |
| Sub-packet Payload | | | | | | | |
| SID = 1 | 1 | 0 | 0 | 0 | CRC | TSP3-0 | PHI |
| Packet Payload for SID 1 | | | | | | | |

Fig. 9A

| Phase | Transmitted Link Characters | Binary pattern |
|---|---|---|
| 1 | D10.2 | 0101010101 0101010101 0101010101 0101010101 0101010101 |
| 2 | K28.7 | 0011111000 0011111000 0011111000 0011111000 0011111000 |
| 3 | K28.5, and three D10.2 | 0011111010 0101010101 0101010101 0101010101 1100000101 |

Main Link Training Pattern

Fig. 11

8B/10B Special Characters Usage

| Encoding | Name | Description |
|---|---|---|
| K28.5 | Comma (COM) | Inserted between packets. Also used as part of Test Pattern |
| K28.7 | TrainingPattern (TPN) | Sent during Training Pattern transmission for bit/byte clock lock. |
| K23.7 | Null (NUL) | Sent within the packet period when there is no data to transmit. |
| K28.2 | Sub-packet Start (SPS) | Indicate a start of sub-packet inserted in a packet |
| K29.7 | Sub-packet End (SPE) | Indicate an end of sub-packet inserted in a main packet. |
| K28.0 | PacketHeaderIndicator (PHI) | Sent along with 16 bits of header for header identification. |
| K28.1 | | Reserved |
| K28.3 | | Reserved |
| K28.4 | | Reserved |
| K28.6 | | Reserved |
| K25.7 | | Reserved |
| K27.7 | | Reserved |

Fig. 13

PCI EXPRESS MOTHERBOARD WITH DEDICATED DD-EXPRESS CONNECTOR

PCI Express motherboard with passive connector card.

PCI Express motherboard with add-in DD-Express graphics card

Legacy graphics accelerator bus transmitter mounted on a legacy bus card slot converts digital raster data/timing signals into main link streams

# MULTIMEDIA INTERFACE

CROSS REFERENCE TO RELATED APPLICATIONS

This application is a continuation in part of U.S. patent application Ser. No. 10/726,794 filed Dec. 2, 2003 entitled "PACKET BASED VIDEO DISPLAY INTERFACE AND METHODS OF USE THEREOF" by Kobayashi that, in turn, takes priority under 35 U.S.C. 119(e) to (i) U.S. Provisional Patent Application No. 60/467,804, filed on May 1, 2003 entitled "DIGITAL/ANALOG VIDEO INTERCONNECT AND METHODS OF USE THEREOF" by Kobayashi, (ii) U.S. Provisional Patent Application No. 60/504,060, filed on Sep. 18, 2003 entitled "DIGITAL/ANALOG VIDEO INTERCONNECT AND METHODS OF USE THEREOF" by Kobayashi, (iii) U.S. Provisional Patent Application No. 60/474,085 filed on May 28, 2003 entitled "DIGITAL/ANALOG VIDEO INTERCONNECT AND METHODS OF USE THEREOF" by Kobayashi, and (iv) U.S. Provisional Patent Application No. 60/474,084 filed on May 28, 2003 entitled "SIMPLE ENUMERATION METHOD FOR THE LINK CLOCK RATE AND THE PIXEL/AUDIO CLOCK RATE" by Kobayashi, each of which is hereby incorporated by reference herein in their entirety. This application is also related to the following co-pending U.S. patent applications each of which are herein incorporated by reference, (i) U.S. patent application Ser. No. 10/726,802 filed on Dec. 2, 2003 entitled "METHOD OF ADAPTIVELY CONNECTING A VIDEO SOURCE AND A VIDEO DISPLAY" by Kobayashi; (ii) U.S. patent application Ser. No. 10/726,438 filed Dec. 2, 2003 that has issued as U.S. Pat. No. 7,068,686 and continuing U.S. patent application Ser. No. 11/291,015 that has issued as U.S. Pat. No. 7,177,329, both entitled "METHOD AND APPARATUS FOR EFFICIENT TRANSMISSION OF MULTIMEDIA DATA PACKETS" by Kobayashi; (iii) U.S. patent application Ser. No. 10/726,440 filed Dec. 2, 2003 entitled "METHOD OF OPTIMIZING MULTIMEDIA PACKET TRANSMISSION RATE" by Kobayashi; (iv) U.S. patent application Ser. No. 10/727,131 filed Dec. 2, 2003 that has issued as U.S. Pat. No. 7,088,741 entitled "USING AN AUXILIARY CHANNEL FOR VIDEO MONITOR TRAINING" by Kobayashi; (v) U.S. patent application Ser. No. 10/726,350 filed Dec. 2, 2003 entitled "TECHNIQUES FOR REDUCING MULTIMEDIA DATA PACKET OVERHEAD" by Kobayashi; (vi) U.S. patent application Ser. No. 10/726,362 filed Dec. 2, 2003 entitled "PACKET BASED CLOSED LOOP VIDEO DISPLAY INTERFACE WITH PERIODIC STATUS CHECKS" by Kobayashi; (vii) U.S. patent application Ser. No. 10/726,895 filed Dec. 2, 2003 entitled "MINIMIZING BUFFER REQUIREMENTS IN A DIGITAL VIDEO SYSTEM" by Kobayashi; (viii) U.S. patent application Ser. No. 10/726,441 filed Dec. 2, 2003 entitled "VIDEO INTERFACE ARRANGED TO PROVIDE PIXEL DATA INDEPENDENT OF A LINK CHARACTER CLOCK" by Kobayashi; and (ix) U.S. patent application Ser. No. 10/726,934 filed Dec. 2, 2003 that has issued as U.S. Pat. No. 6,992,987 entitled "ENUMERATION METHOD FOR THE LINK CLOCK RATE AND THE PIXEL/AUDIO CLOCK RATE" by Kobayashi. This application is also related to the following co-pending applications: (x) U.S. patent application Ser. No. 10/909,103 filed Jul. 29, 2004 entitled "USING PACKET TRANSFER FOR DRIVING LCD PANEL DRIVER ELECTRONICS" by Kobayashi; (xi) U.S. patent application Ser. No. 10/909,027 filed Jul. 29, 2004 entitled "BYPASSING PIXEL CLOCK GENERATION AND CRTC CIRCUITS IN A GRAPHICS CONTROLLER CHIP" by Kobayashi, (xi) U.S. patent application Ser. No. 10/909,085 filed Jul. 29, 2004 entitled "PACKET BASED STREAM TRANSPORT SCHEDULER AND METHODS OF USE THEREOF" by Kobayashi, and (xii) U.S. patent application Ser. No. 10/762,680 filed Jan. 21, 2004 entitled "PACKET BASED HIGH DEFINITION HIGH-BANDWIDTH DIGITAL CONTENT PROTECTION" by Kobayashi.

FIELD OF THE INVENTION

The invention relates to display devices. More specifically, the invention relates to digital display interface suitable for coupling video sources to video display devices.

BACKGROUND OF THE INVENTION

Currently, video display technology is divided into analog type display devices (such as cathode ray tubes) and digital type display devices (such as liquid crystal display, or LCD, plasma screens, etc.), each of which must be driven by specific input signals in order to successfully display an image. For example, a typical analog system includes an analog source (such as a personal computer, DVD player, etc.) coupled directly to a display device (sometimes referred to as a video sink) by way of a communication link. The communication link typically takes the form of a cable (such as an analog VGA cable in the case of a PC, otherwise referred to as VGA DB15 cable) well known to those of skill in the art. For example, the VGA DB15 cable includes 15 pins, each of which is arranged to carry a specific signal.

One of the advantages of the VGA DB15 cable is the ubiquitous nature of the cable, due to the large and ever-expanding installed base. As long as the analog systems described above predominate, there is little incentive to migrate away from any other cable form than the VGA DB15.

However, in recent years, the exploding growth of digital systems has made the use of digital capable cables such as Digital Visual Interface (DVI) cable more desirable. It is well known that DVI is a digital interface standard created by the Digital Display Working Group (DDWG). Data are transmitted using the transition minimized differential signaling (TMDS) protocol, providing a digital signal from the PC's graphics subsystem to the display. DVI handles bandwidths in excess of 160 MHz and thus supports UXGA and HDTV with a single set of links.

Today's display interconnect landscape includes the VGA (analog) and DVI (digital) for desktop display interconnect applications as well as LVDS (digital) for internal connectivity applications within laptops and other all-in-one devices. Graphics IC vendors, display controller IC vendors, monitor manufacturers and PC OEMs as well as desktop PC consumers, to one degree or another, must factor interface choice into their design, product definition, manufacturing, marketing and purchase decisions. For example, if a consumer purchases a PC with an analog VGA interface then the consumer must either purchase an analog monitor or a digital monitor in which the analog video signal provided by the VGA interface has been digitized by way of an inline analog to digital converter (ADC) or an ADC built into the particular monitor.

Therefore, it would be desirable to have a digital interface that is more cost effective than current interfaces (such as DVI) for coupling video sources and video displays. In some cases, the digital interface would also be backward compatible with analog video, such as VGA.

SUMMARY OF THE INVENTION

A multimedia interface is described. The interface includes at least a receiver unit arranged to receive video data packets at a link rate, wherein the video data packets correspond to a native video data stream at a native video clock rate; a video enhancement unit coupled to the receiver unit arranged to process the received video data packets; and a transmitter unit arranged to transmit the processed video packets at the link rate, wherein the link rate is independent of the native video clock rate.

In another embodiment, a system is disclosed that includes at least the following: a multimedia source arranged to provide a reduced set of multimedia formats each at a native multimedia clock rate; a multimedia display; and a multimedia interface arranged to couple the portable multimedia source and the display. In the described embodiment, the interface includes a uni-directional main link coupling the multimedia source to the multimedia sink arranged to carry a packetized multimedia data stream from the multimedia source to the multimedia display at a link rate that is independent of the native multimedia clock rate, a half duplex, bi-directional auxiliary channel connecting the multimedia source and the display that provides in concert with the uni-directional main link, a secondary communication link between the multimedia source and the display for transferring information between the multimedia source and the display, and a connector arrangement arranged to electrically connect the uni-directional main link and the half duplex, bi-directional auxiliary channel to the multimedia source and the display. The connector includes, at least, a video processing unit arranged to process video data received from the multimedia source and pass the processed video data to the display by way of the main link.

BRIEF DESCRIPTION OF THE DRAWINGS

FIG. 1 shows a generalized representation of a cross platform display interface in accordance with an embodiment of the invention.

FIG. 3 shows exemplary main link rates in accordance with an embodiment of the invention.

FIG. 9A shows a representative sub-packet in accordance with an embodiment of the invention.

FIG. 11 shows an exemplary link training pattern in accordance with an embodiment of the invention.

FIG. 13 shows an exemplary special character mapping using 8B/10B in accordance with an embodiment of the invention.

DETAILED DESCRIPTION OF SELECTED EMBODIMENTS

Figure 2A:
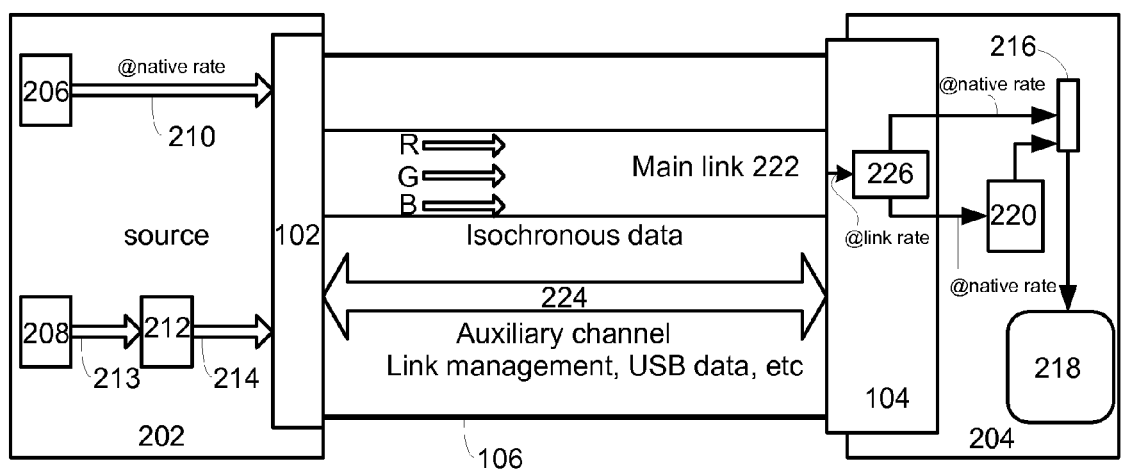
FIGS. 2A-2C illustrate a video interface system that is used to connect a video source and a video display unit in accordance with a number of embodiments of the invention.

Reference will now be made in detail to a particular embodiment of the invention, an example of which is illustrated in the accompanying drawings. While the invention will be described in conjunction with the particular embodiment, it will be understood that it is not intended to limit the invention to the described embodiment. To the contrary, it is intended to cover alternatives, modifications, and equivalents as may be included within the spirit and scope of the invention as defined by the appended claims.

The described interface is a point-to-point, packet-based, plug & play, serial digital display interface that is both open and scalable that is suitable for use with, but not limited to, desktop monitors as well as providing LCD connectivity within notebook/all-in-one PC's, and consumer electronics display devices including HDTV displays and the like. Unlike conventional display interfaces that transmit a single video raster plus timing signals such as Vsync, Hsync, DE, etc., the inventive interface provides a system of multi-stream packet transfer capable of transferring one or more packet streams simultaneously in the form of "virtual pipes" established within a physical link.

For example, FIG. 1 shows a generalized representation of a cross platform packet based digital video display interface 100 in accordance with an embodiment of the invention. The interface 100 connects a transmitter 102 to a receiver 104 by way of a physical link 106 (also referred to as a pipe). In the described embodiment, a number of data streams 108-112 are received at the transmitter 102 that, if necessary, packetizes each into a corresponding number of data packets 114. These data packets are then formed into corresponding data streams each of which are passed by way of an associated virtual pipe 116-120 to the receiver 104. It should be noted that the link rate (i.e., the data packet transfer rate) for each virtual link can be optimized for the particular data stream resulting in the physical link 106 carrying data streams each having an associated link rate (each of which could be different from each other depending upon the particular data stream). The data streams 110-114 can take any number of forms such as video, graphic, audio, etc.

Typically, when the source is a video source, the data streams 110-114 include various video signals that can have any number and type of well-known formats, such as composite video, serial digital, parallel digital, RGB, or consumer digital video. The video signal can be an analog video signal provided the source 102 includes some form of an analog video source such as for example, an analog television, still camera, analog VCR, DVD player, camcorder, laser disk player, TV tuner, set top box (with satellite DSS or cable signal) and the like. The source 102 can also include a digital image source such as for example a digital television (DTV), digital still camera, and the like. The digital video signal can be any number and type of well known digital formats such as, SMPTE 274M-1995 (1920×1080 resolution, progressive or interlaced scan), SMPTE 296M-1997 (1280×720 resolution, progressive scan), as well as standard 480 progressive scan video.

In the case where the source 102 provides an analog image signal, an analog-to-digital converter (A/D) converts an analog voltage or current signal into a discrete series of digitally encoded numbers (signal) forming in the process an appropriate digital image data word suitable for digital processing. Any of a wide variety of A/D converters can be used. By way of example, other A/D converters include, for example those manufactured by: Philips, Texas Instrument, Analog Devices, Brooktree and others.

For example, if the data stream 110 is an analog type signal, the an analog to digital converter (not shown) included in or coupled to the transmitter 102 will digitize the analog data which is then packetized by a packetizer that converts the digitized data stream 110 into a number of data packets 114 each of which will be transmitted to the receiver 104 by way of the virtual link 116. The receiver 104 will then reconstitute the data stream 110 by appropriately recombining the data packets 114 into their original format. It should be noted that the link rate is independent of the native stream rates. The only requirement is that the link bandwidth of the physical link 106 be higher than the aggregate bandwidth of data stream(s) to be transmitted. In the described embodiment, the incoming data (such as pixel data in the case of video data) is packed over the respective virtual link based upon a data mapping definition. In this way, the physical link 106 (or any of the constituent virtual links) does not, as does conventional interconnects such as DVI, carry one pixel data per link character clock.

In this way, the interface 100 provides a scaleable medium for the transport of not only video and graphics data, but also audio and other application data as may be required. In addition, the invention supports hot-plug event detection and automatically sets the physical link (or pipe) to its optimum transmission rate. The invention provides for a low pin count, purely digital display interconnect for all displays suitable for multiple platforms. Such platforms include host to display, laptop/all-in-one as well as HDTV and other consumer electronics applications.

In addition to providing video and graphics data, display timing information can be embedded in the digital stream providing essentially perfect and instant display alignment, obviating the need for features like "Auto-Adjust" and the like. The packet based nature of the inventive interface provides scalability to support multiple, digital data streams such as multiple video/graphics streams and audio streams for multimedia applications. In addition, a universal serial bus (USB) transport for peripheral attachment and display control can be provided without the need for additional cabling.

Other embodiments of the inventive display interface will be discussed below.

Figure 2B:
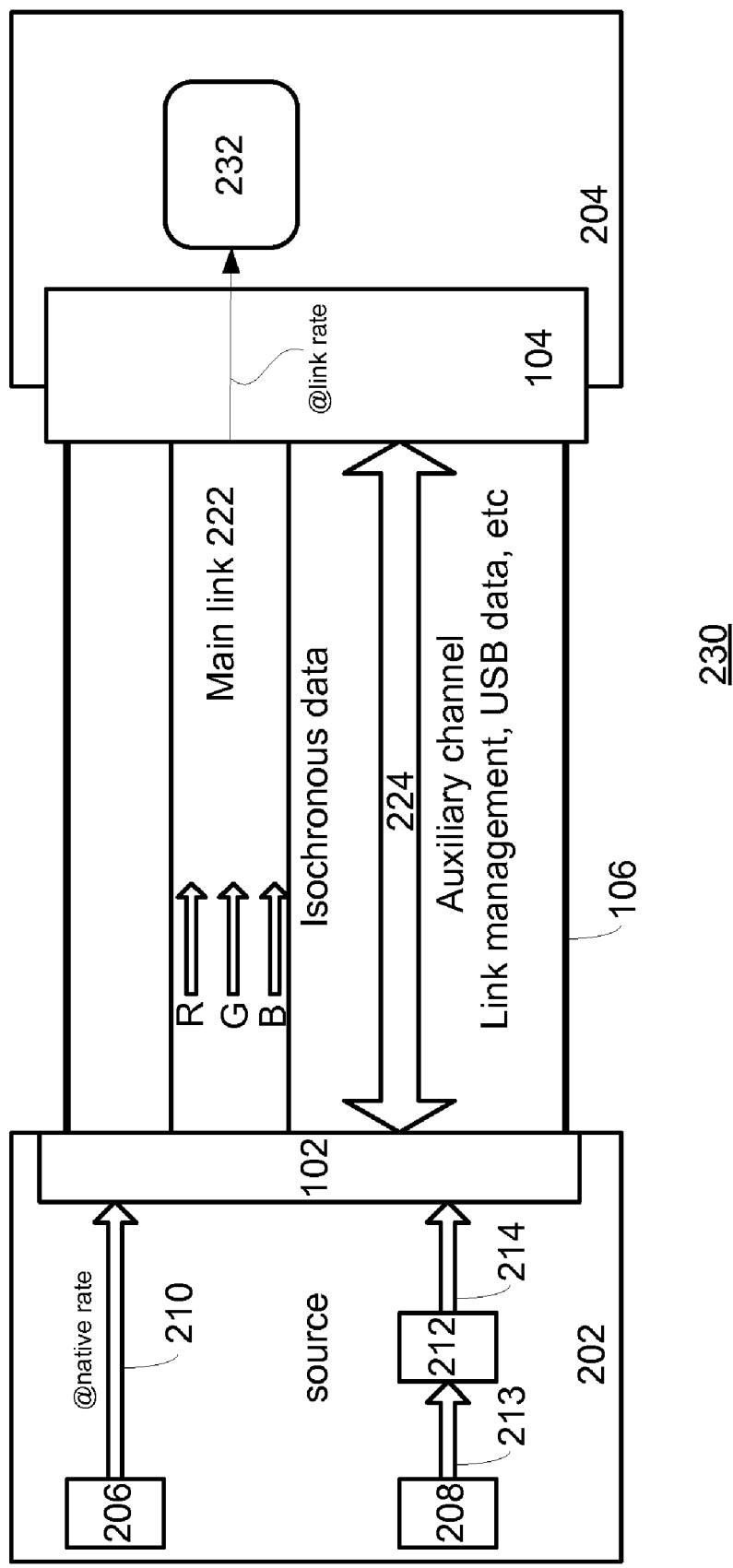

FIG. 2 illustrates a system 200 based upon the system 100 shown in FIG. 1 that is used to connect a video source 202 and a video display unit 204. In the illustrated embodiment, the video source 202 can include either or both a digital image (or digital video source) 206 and an analog image (or analog video source) 208. In the case of the digital image source 206, a digital data stream 210 is provided to the transmitter 102 whereas in the case of the analog video source 208, an A/D converter unit 212 coupled thereto, converts an analog data stream 213 to a corresponding digital data stream 214. The digital data stream 214 is then processed in much the same manner as the digital data stream 210 by the transmitter 102. The display unit 204 can be an analog type display or a digital type display or in some cases can process either analog or digital signals provided thereto. In any case, the display unit 204 includes a display interface 216 that interfaces the receiver 104 with a display 218 and a D/A converter unit 220 in the case of an analog type display. In the described embodiment, the video source 202 can take any number of forms (such as a personal desktop computer, digital or analog TV, set top box, etc.) whereas the video display unit 104 can take the form of a video display (such as an LCD type display, CRT type display, etc.).

Regardless of the type of video source or video sink, however, the various data streams are digitized (if necessary) and packetized prior to transmission over the physical link 106 which includes a uni-directional main link 222 for isochronous data streams and a bi-directional auxiliary channel 224 for link setup and other data traffic (such as various link management information, Universal serial bus (USB) data, etc.) between the video source 202 and the video display 204.

The main link 222 is thereby capable of simultaneously transmitting multiple isochronous data streams (such as multiple video/graphics streams and multi-channel audio streams). In the described embodiment, the main link 222 includes a number of different virtual channels, each capable of transferring isochronous data streams (such as uncompressed graphics/video and audio data) at multiple gigabits per second (Gbps). From a logical viewpoint, therefore, the main link 222 appears as a single physical pipe and within this single physical pipe, multiple virtual pipes can be established. In this way, logical data streams are not assigned to physical channels rather, each logical data stream is carried in its own logical pipe (i.e., virtual channel described above).

In the described embodiment, the speed, or transfer rate, of the main link 222 is adjustable to compensate for link conditions. For example, in one implementation, the speed of the main link 222 can be adjusted in a range approximated by a slowest speed of about 1.0 Gbps to about 2.5 Gbps per channel in approximately 0.4 Gbps increments (see FIG. 3). At 2.5 Gbps per channel, the main link 222 can support SXGA 60 Hz with a color depth of 18 bits per pixel over a single channel. It should be noted that a reduction in the number of channels reduces not only the cost of interconnect, but also reduces the power consumption which is an important consideration (and desirable) for power sensitive applications such as portable devices and the like. However, by increasing the number of channels to four, the main link 222 can support WQSXGA (3200×2048 image resolution) with a color depth of 24-bits per pixel at 60 Hz. or QSXGA (2560×2048) with a color depth of 18-bits per pixel at 60 Hz, without data compression. Even at the lowest rate of 1.0 Gbps per channel, only two channels are required to support an uncompressed HDTV (i.e., 1080i or 720p) data stream.

Figure 2C:
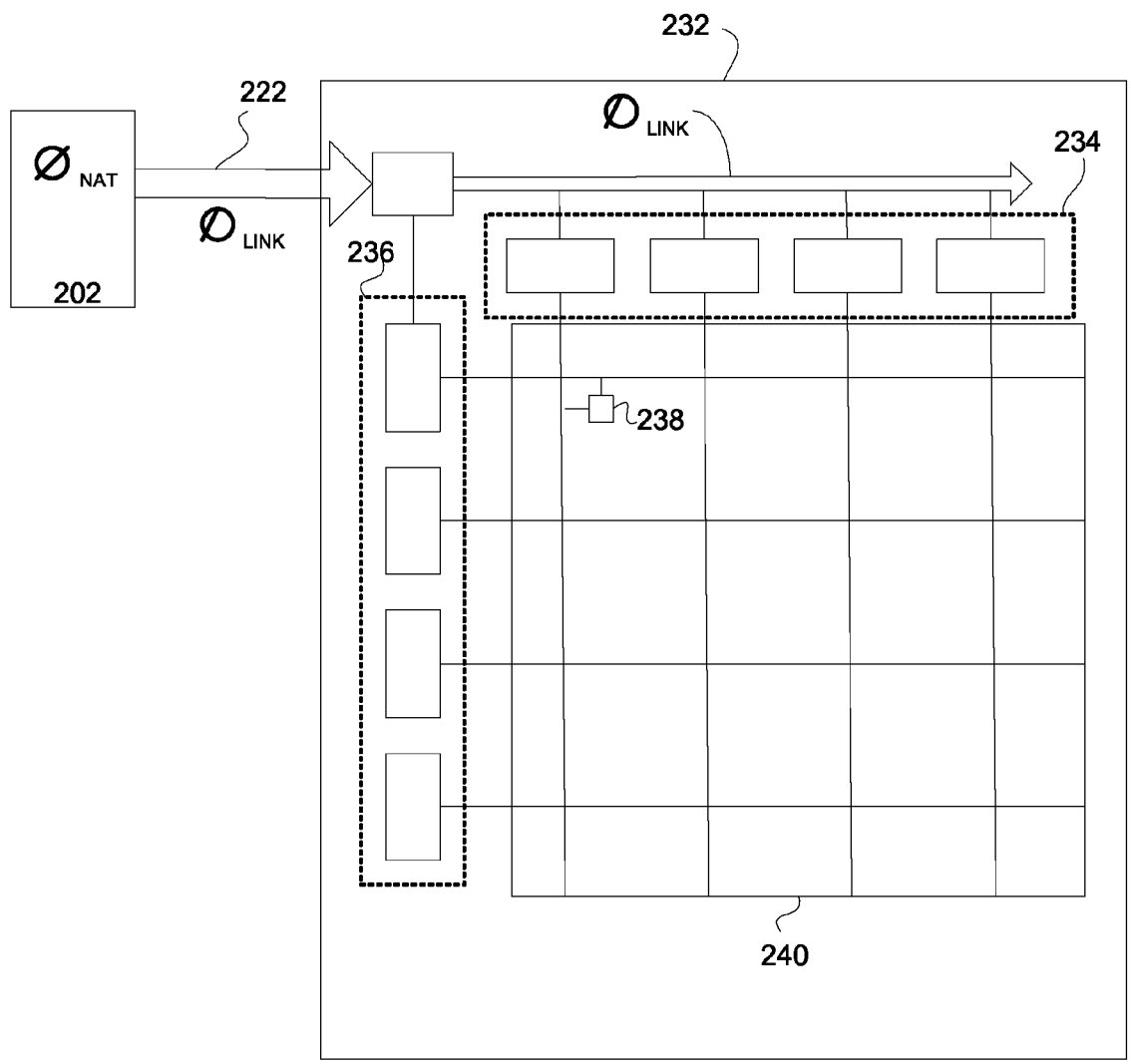

In the described embodiment, a main link data rate is chosen whose bandwidth exceeds the aggregate bandwidth of the constituent virtual links. Data sent to the interface arrives at the transmitter at its native rate. A time-base recovery (TBR) unit 226 within the receiver 104 regenerates the stream's original native rate using time stamps embedded in the main link data packets, if necessary. It should be noted, however, that for appropriately configured digital display devices 232 shown in FIG. 2B, time base recovery is unnecessary since display data is be sent to the display driver electronics at the link character clock rate, thereby greatly reducing the number of channels required with a commensurate reduction in complexity and cost for the display. For example, FIG. 2C illustrates an exemplary LCD panel 232 configured in such a way that no time base recovery since display data is essentially pipelined to the various column drivers 234 that are used in combination with row drivers 236 to drive selected display elements 238 in the array 240.

Other embodiments describe a simple enumeration method for the link rate and the pixel/audio clock rate. It has been researched and understood that all the standard pixel/audio clock frequencies that exist today are a subset of the following master frequency:

$$23.76 \text{ GHz} = 2^{10} \times 3^3 \times 5^7 \times 11^1 \text{ Hz}$$

This means that a pixel (or audio) clock rate can be expressed with four parameters, A, B, C, and D as:

$$\text{Pixel clock rate} = 2^A \times 3^B \times 5^C \times 11^D$$

A=4 bits, B=2 bits, C=3 bits, and D=1 bit.

Even for a link whose link rate (which is the serial link bit rate/10 for a link that uses 10-bit character such as 8B/10B characters) may be different from the pixel clock rate, there is a benefit in defining the link rate with these four parameters, A', B', C', and D': The benefit is the simplicity in regenerating pixel/audio clocks from a link clock. For example, let's say the link rate is set as A'=6, B'=3, C'=7, and D'=0 and the corresponding link rate is 135 MHz. However, suppose the pixel clock rate is set as A=8, B=3, C=6, and D=0 (=108 MHz), then the pixel clock can be generated from link clock as pixel clock rate is equal to the link rate*22/51.

Referring back to those systems requiring time base recovery, the time-base recovery unit 226 may be implemented as a digital clock synthesizer. For an uncompressed video stream, the time stamp is stored in the packet header which as described in more detail below, is a 20-bit value. For a given stream, four of 20 bits are stored in each header successively (TS3-0, TS7-4, TS11-8, TS15-12, TS19-16). Native stream frequency (Freq_native) is obtained from link character clock frequency (Freq_link_char) as:

$$\text{Freq\_native} = \text{Freq\_link\_char} \times (TS19\text{-}0)/220 \qquad \text{Eq}(1)$$

The transmitter 102 generates this time stamp by counting the number of native stream clocks in 220 cycles of the link character clock frequency period. The counter updates the value every 220 cycles of the link character clock. Since these two clocks are asynchronous with each other, the time stamp value will change by 1 over time. Between updates, the transmitter 102 will repeatedly send the same time stamp in the header of the given packet stream. A sudden change of the time stamp value (by more than 1 count) may be interpreted by the receiver as an indication of an unstable condition of the stream source.

It should be noted that, no time stamp is communicated for an audio stream. In this case, the source device informs the display device of the audio sample rate and number of bits per sample. By determining the audio rate based upon Eq(2) and the link character rate, the display device regenerates the original audio stream rate.

$$\text{Audio rate} = (\text{audio sample rate}) \times (\text{\# bits per sample}) \times (\text{\# channels}) \qquad \text{Eq}(2)$$

Figure 4A:
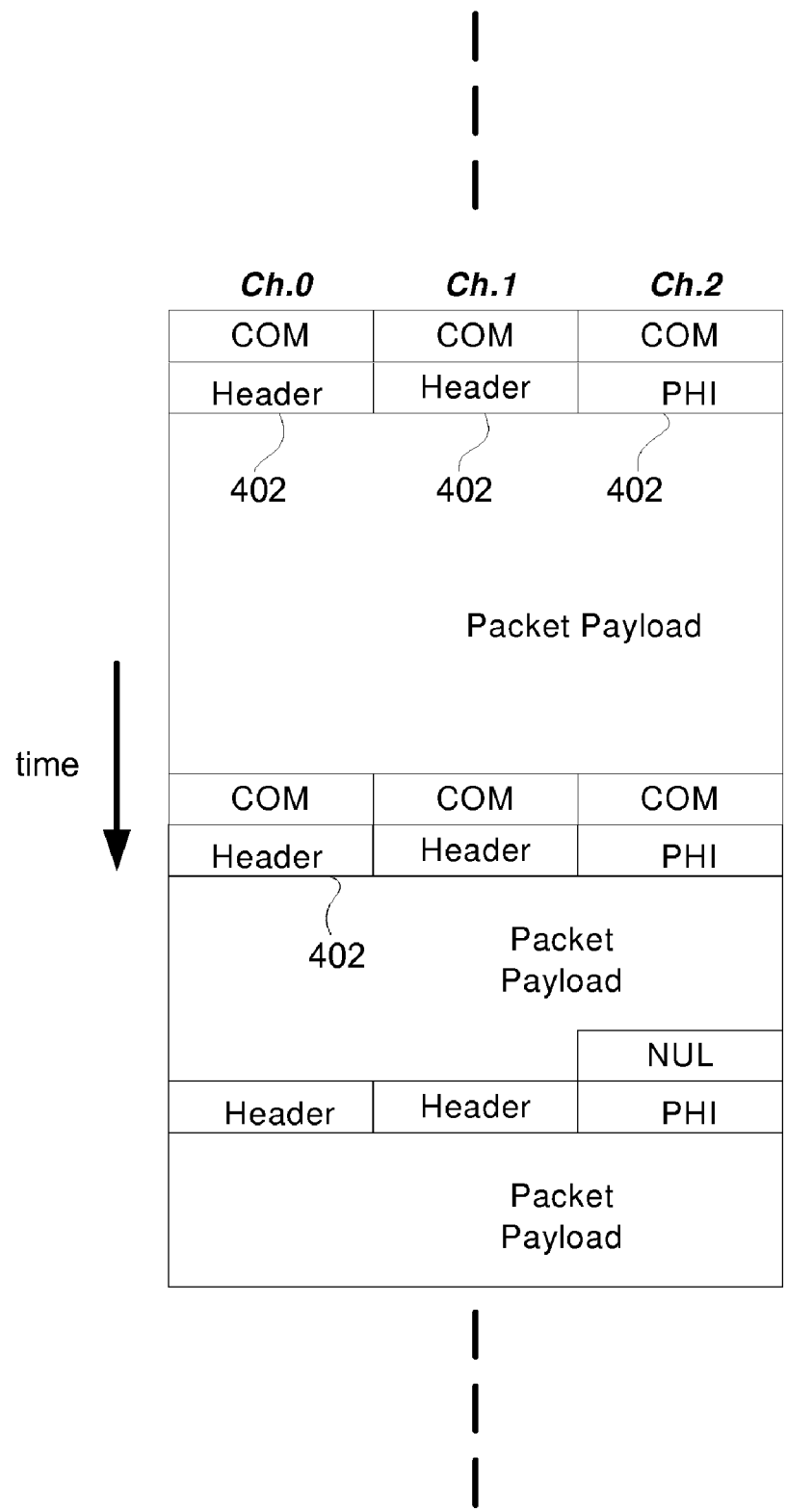
FIG. 4A shows a main link data packet in accordance with an embodiment of the invention.
Figure 4B:
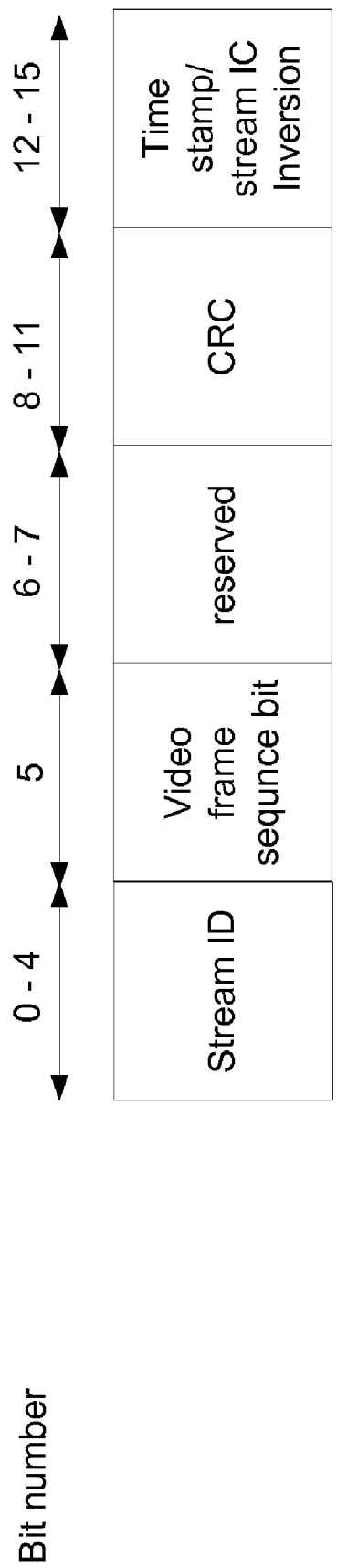
FIG. 4B shows a main link packet header in accordance with an embodiment of the invention.

A main link data packet 400 shown in FIG. 4A includes a main link packet header 402 as shown in FIG. 4B that is formed of 16 bits where bits 3-0 are the Stream ID (SID) (indicating that maximum stream count is 16), bit 4 is the Time Stamp (TS) LSB. When bit 4 is equal to 1, this packet header has the least significant 4 bits of Time Stamp value (used only for uncompressed video stream). Bit 5 is a Video frame sequence bit which acts as the least significant bit of the frame counter which toggles from "0" to "1" or from "1" to "0" at the video frame boundary (used only for uncompressed video stream). Bits 7 and 6 are reserved whereas bits 8 through 10 are a 4-bit CRC (CRC) that checks errors for the previous eight bits. Bits 15-12 are Time Stamp/Stream ID Inversion. (TSP/SIDn) which for uncompressed video are used as four bits of 20-bit Time Stamp value.

One of the advantages of the inventive interface is the ability to multiplex different data streams each of which can be different formats as well as have certain main link data packets include a number of sub packets. For example, FIG. 5 shows a system 500 arranged to provide sub-packet enclosure and multiple-packet multiplexing in accordance with an embodiment of the invention. It should be noted that the system 500 is a particular embodiment of the system 200 shown in FIG. 2 and should therefore not be construed as limiting either the scope or intent of the invention. The system 500 includes a stream source multiplexer 502 included in the transmitter 102 used to combine a stream 1 supplemental data stream 504 with the data stream 210 to form a multiplexed data stream 506. The multiplexed data stream 506 is then forwarded to a link layer multiplexer 508 that combines any of a number of data streams to form a multiplexed main link stream 510 formed of a number of data packets 512 some of which may include any of a number of sub packets 514 enclosed therein. A link layer de-multiplexer 516 splits the multiplexed data stream 510 into its constituent data streams based on the stream IDs (SIDs) and associated sub packet headers while a stream sink de-multiplexer 518 further splits off the stream 1 supplemental data stream contained in the sub-packets.

Figure 5A:
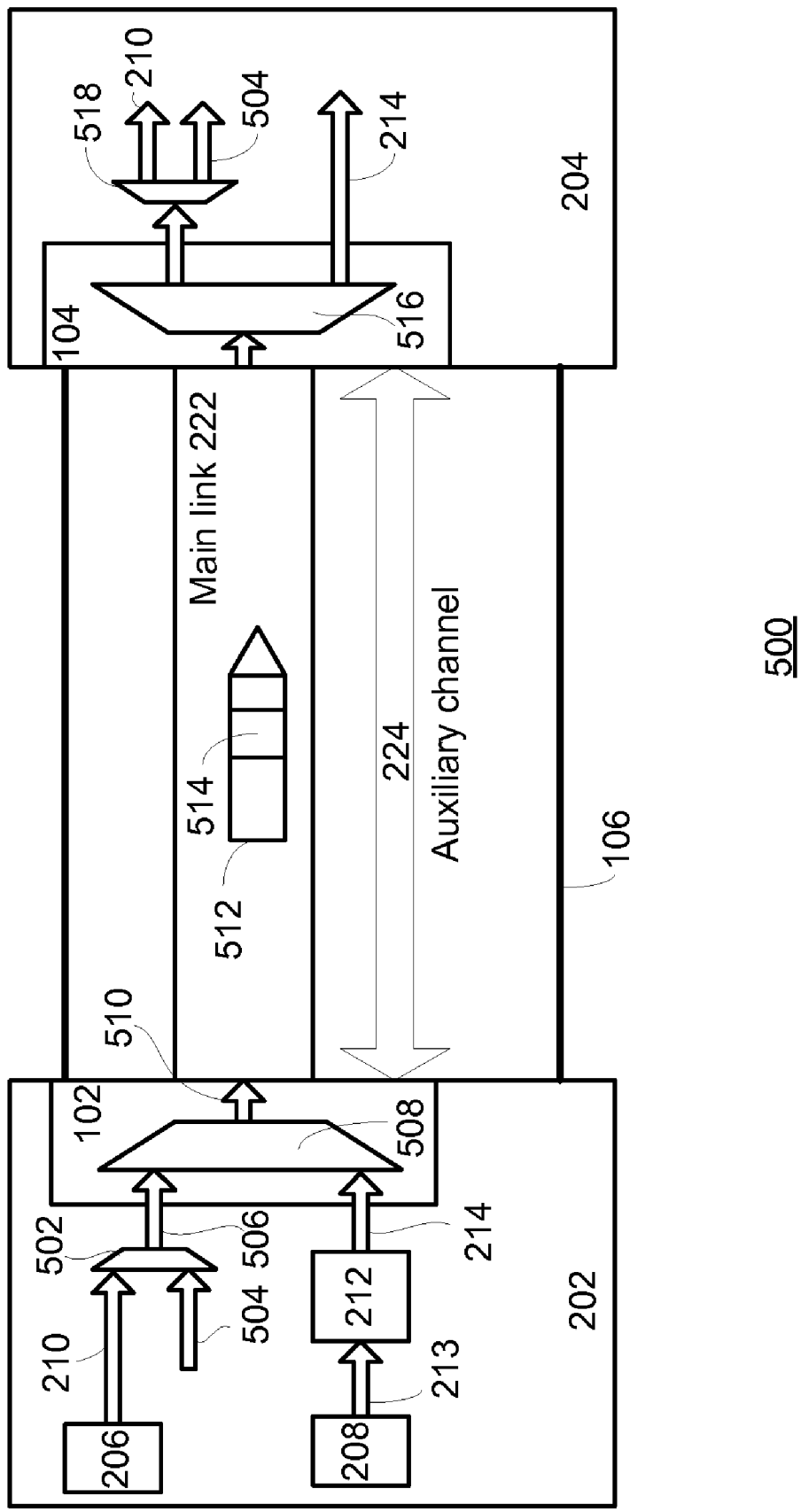
FIG. 5A shows a system arranged to provide sub-packet enclosure and multiple-packet multiplexing in accordance with an embodiment of the invention.
Figure 5B:
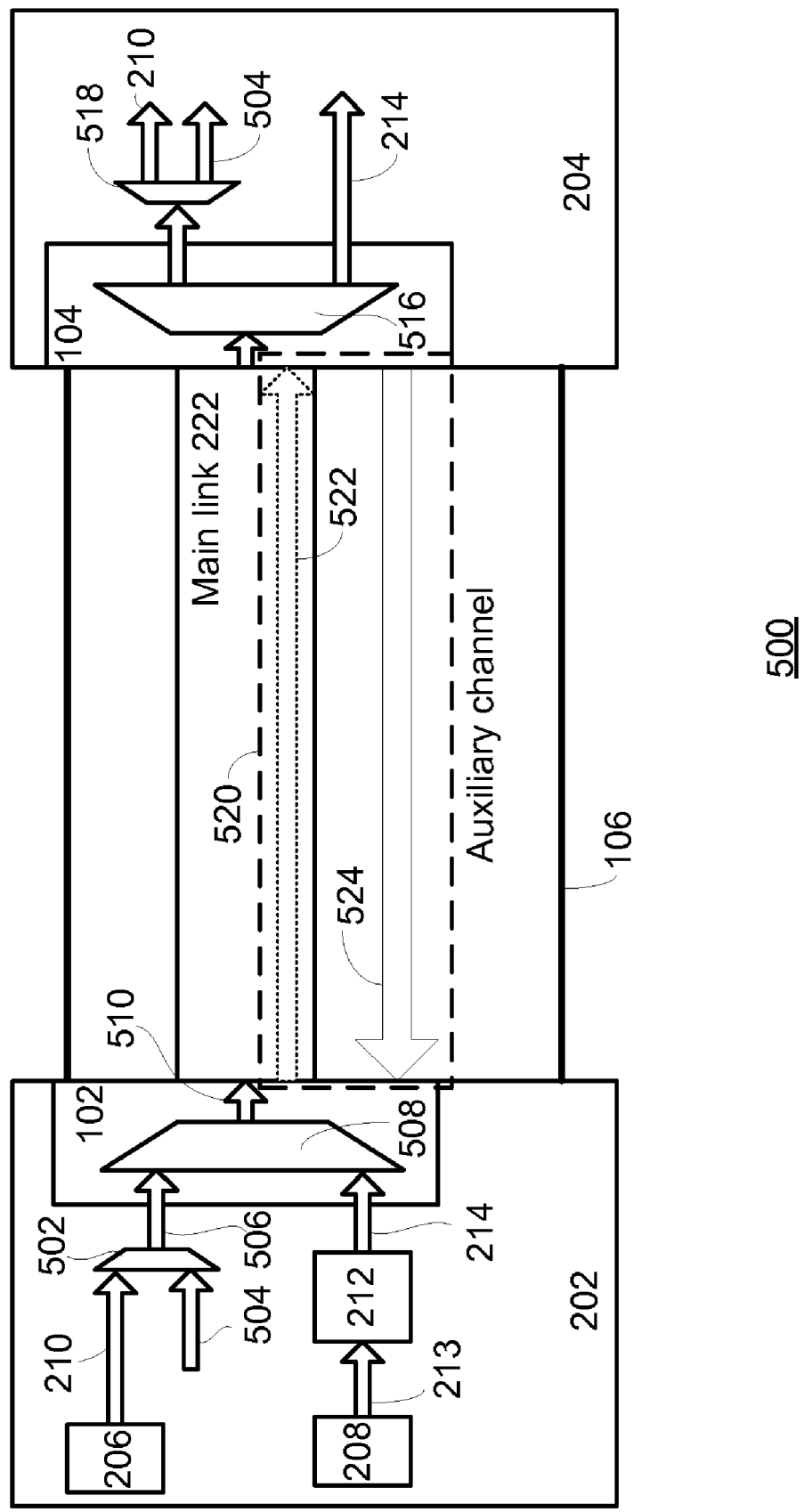
FIG. 5B shows another implementation of the system shown in FIG. 5A.
Figure 6:
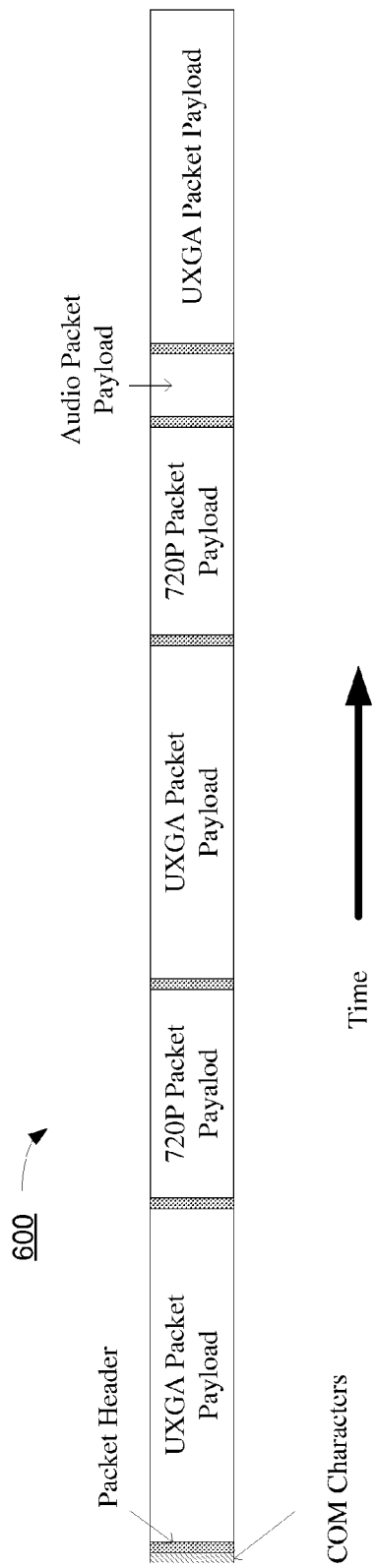
FIG. 6 shows a high-level diagram of the multiplexed main link stream as an example of the stream shown in FIG. 5.

FIG. 6 shows a high-level diagram of the multiplexed main link stream 600 as an example of the stream 510 shown in FIG. 5 when three streams are multiplexed over the main link 222. The three streams in this example are: UXGA graphics (Stream ID=1), 1280×720p video (Stream ID=2), and audio (Stream ID=3). The small packet header size of main link packet 400 minimizes the packet overhead, which results in the very high link efficiency. The reason the packet header can be so small is that the packet attributes are communicated via the auxiliary channel 224 prior to the transmission of the packets over main link 222.

Figure 7:
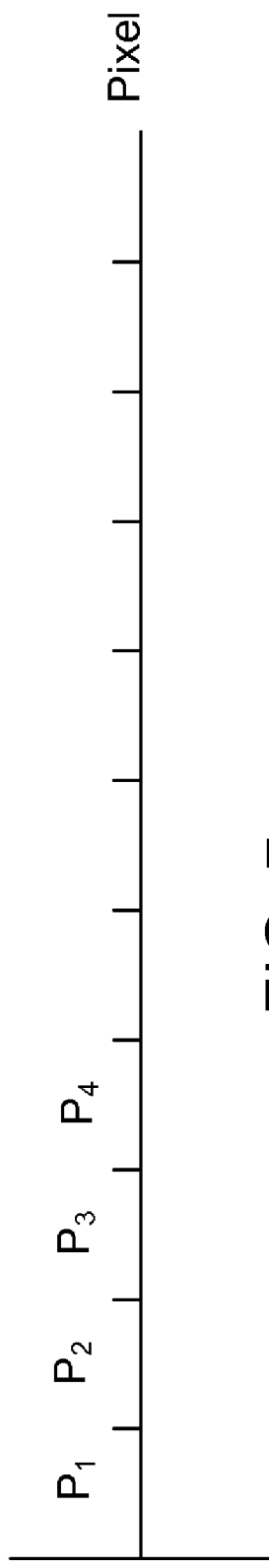
FIG. 7 shows another example of a data stream in accordance with the invention.
Figure 8:
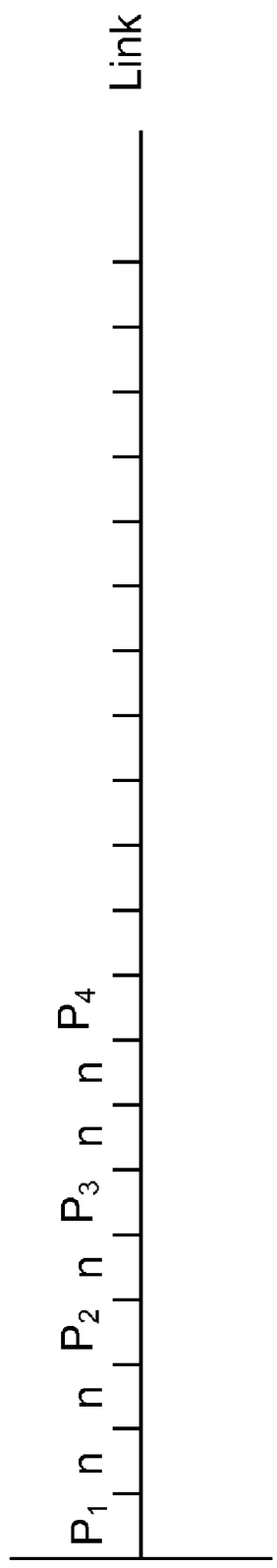
FIG. 8 shows yet another example of a multiplexed data stream in accordance with an embodiment of the invention.

Generally speaking, the sub-packet enclosure is an effective scheme when the main packet stream is an uncompressed video since an uncompressed video data stream has data idle periods corresponding to the video-blanking period. Therefore, main link traffic formed of an uncompressed video stream will include series of Null special character packets during this period. By capitalizing on the ability to multiplex various data streams, certain implementations of the present invention use various methods to compensate for differences between the main link rate and the pixel data rate when the source stream is a video data stream. For example, as illustrated in FIG. 7, the pixel data rate is 0.5 Gb/sec, such that a bit of pixel data is transmitted every 2 ns. In this example, the link rate has been set to 1.25 Gb/sec, such that a bit of pixel data is transmitted each 0.8 ns. Here, transmitter 102 intersperses special characters between pixel data as illustrated in FIG. 8. Two special characters are disposed between a first bit of pixel data P1 and a second bit of pixel data P2. The special characters allow receiver 104 to distinguish each bit of pixel data. Interspersing the special characters between bits of pixel data also creates a steady stream of data that allows the link to maintain synchronization. In this example, the special characters are Null characters. No line buffer is needed for such methods, only a small FIFO, because the link rate is sufficiently fast. However, relatively more logic is required on the receiving side to reconstruct the video signal. The receiver needs to recognize when the special characters begin and end.

An alternative to the interspersing method is to alternate consecutive bits of pixel data with special characters, such as null values. For example, P1 through P4 could be fed into a line buffer included in the transmitter 104, then one or more null values could be fed into the buffer until more pixel data are available. Such implementations require a relatively larger buffer space than the interspersing methods described above. In many such implementations, the time required to fill the line buffer will exceed the time required to transmit the data after the line buffer is full, due to the relatively high link speeds.

Figure 9B:
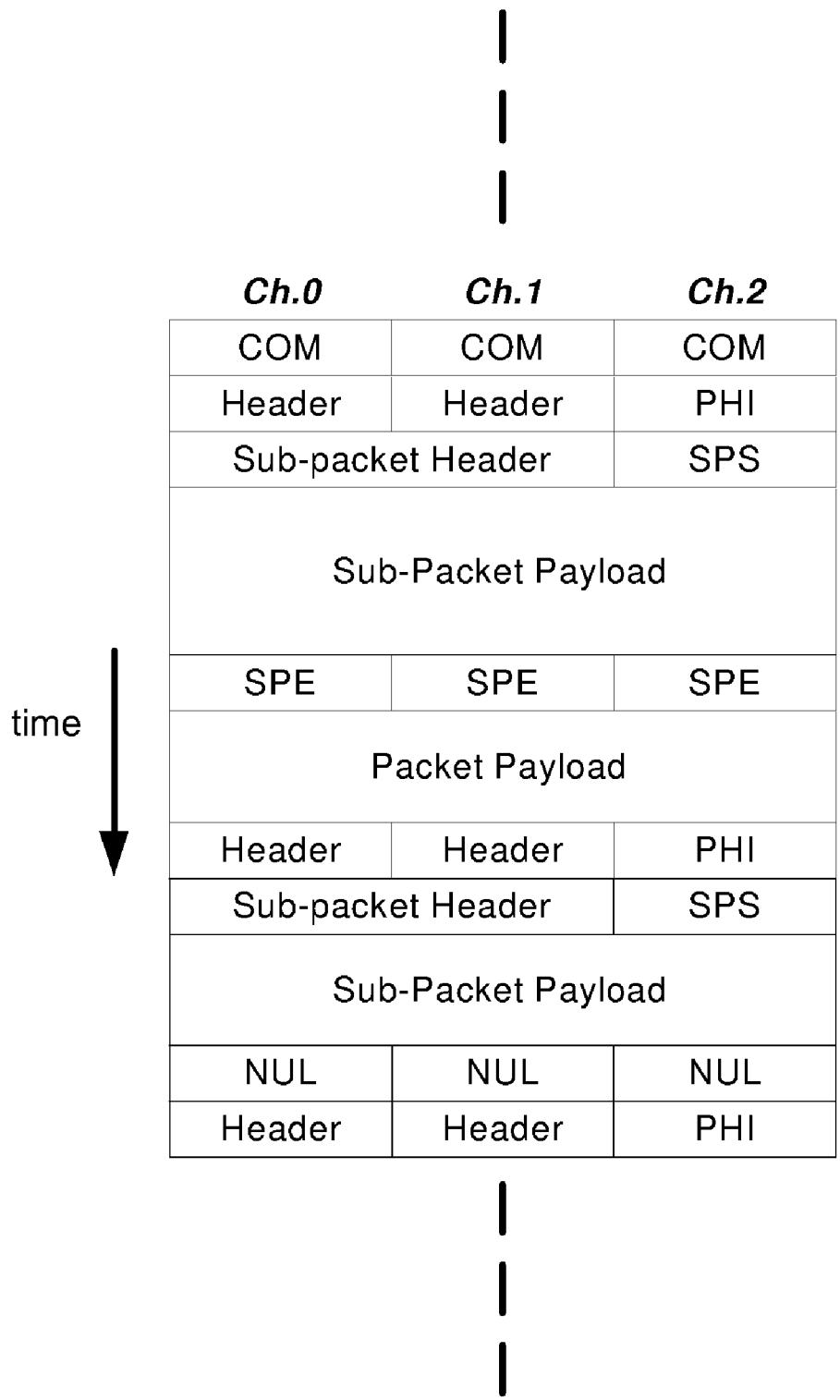
FIG. 9B shows a representative main link data packet in accordance with an embodiment of the invention.

As discussed with reference to FIG. 5A, one of the advantages of the inventive interface is the ability to not only multiplex various data streams, but also the enclosing of any of a number of sub packets within a particular main link data packet. FIG. 9A shows a representative sub-packet 900 in accordance with an embodiment of the invention. The sub-packet 900 includes a sub-packet header 902 that in the described embodiment is 2 bytes and is accompanied by SPS (Sub-Packet Start) special character. If the main link data packet in which the sub-packet 900 is enclosed contains a packet payload in addition to the sub-packet 900, the end of the sub-packet 900 must be marked by SPE (Sub-Packet End) special character. Otherwise, the end of the main packet (as indicated by ensuing COM character in the example shown in FIG. 9B) marks the end of both the sub-packet 902 and the main packet into which it is enclosed. However, a sub-packet does not need to end with SPE when its enclosing main packet has no payload. FIG. 9B shows an exemplary sub-packet format within a main link packet in accordance with an embodiment of the invention. It should be noted that the definition of the header field and sub-packet payload is dependent on the specific application profile that uses the sub-packet 902.

Figure 10:
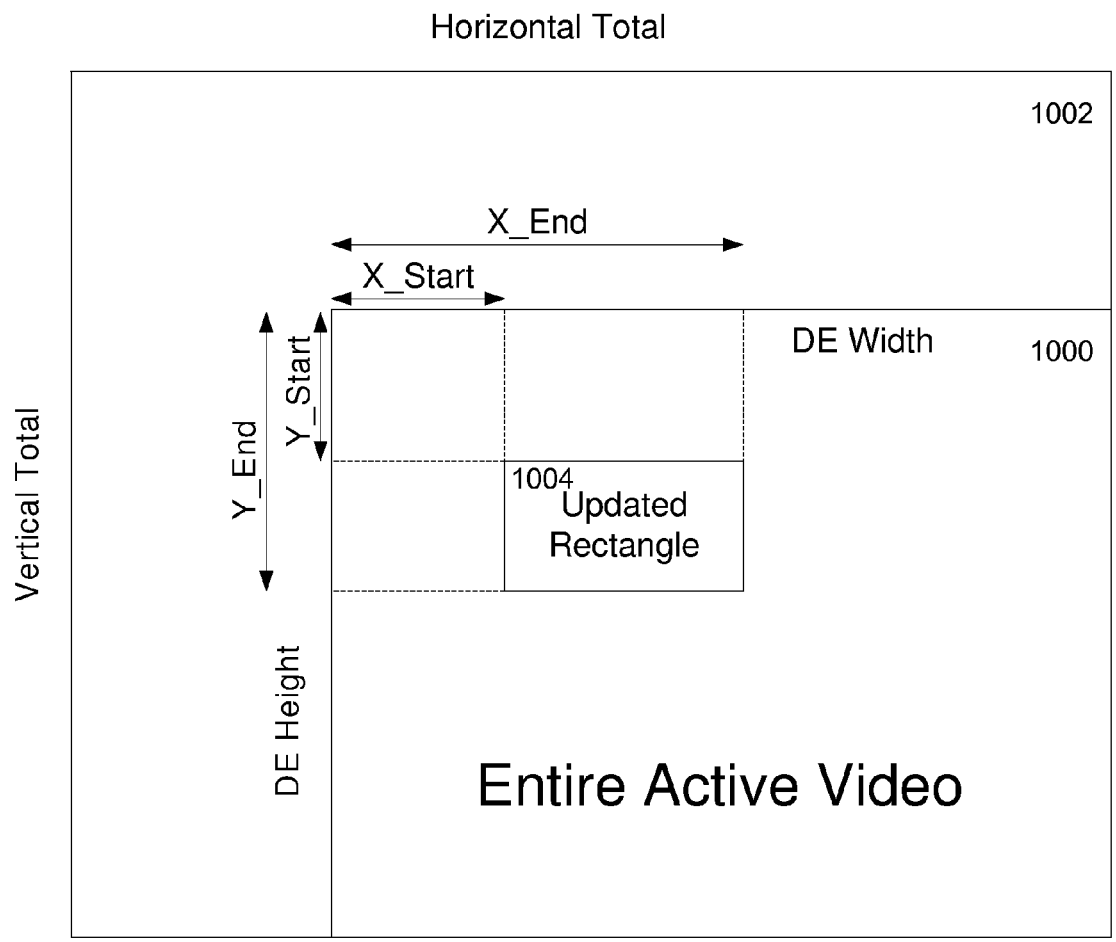
FIG. 10 shows an example of a selectively refreshed graphics image.

A particularly useful example of sub-packet enclosure usage is selective refresh of an uncompressed graphics image 1000 illustrated in FIG. 10. The attributes of the entire frame 1002 (Horizontal/Vertical Total, Image Width/Height, etc.) will be communicated via the auxiliary channel 224 since those attributes stay constant as long as the stream remains valid. In selective refresh operation, only a portion 1004 of the image 1000 is updated per video frame. The four X-Y coordinates of the updated rectangle(s) (i.e., the portion 1004) must be transmitted every frame since the values of the rectangle coordinates changes from frame to frame. Another example is the transmission of color look-up table (CLUT) data for required for 256-color graphic data where the 8-bit pixel data is an entry to the 256-entry CLUT and the content of the CLUT must be dynamically updated.

The single bi-directional auxiliary channel 224 provides a conduit to for various support functions useful for link set up and supporting main link operations as well as to carry auxiliary application data such as USB traffic. For example, with the auxiliary channel 224, a display device can inform the source device of events such as sync loss, dropped packets and the results of training sessions (described below). For example, if a particular training session fails, the transmitter 102 adjusts the main link rate based upon pre-selected or determined results of the failed training session. In this way, the closed loop created by combining an adjustable, high speed main link with a relatively slow and very reliable auxiliary channel allows for robust operation over a variety of link conditions. It should be noted that in some cases (an example of which is shown in FIG. 5B), a logical bi-directional auxiliary channel 520 can be established using a portion 522 of the bandwidth of the main link 222 to transfer data from the source device 202 to the sink device 204 and a uni-directional back channel 524 from the sink device 204 to the source device 202. In some applications, use of this logical bi-directional auxiliary channel may be more desirable than using a half-duplex bi-directional channel described in FIG. 5A.

Prior to starting the transmission of actual packet data streams the transmitter 102 establishes a stable link through a link training session that is analogous in concept to the link setup of the modem. During link training, the main link transmitter 102 sends a pre-defined training pattern so that the receiver 104 can determine whether it can achieve a solid bit/character lock. In the described embodiment, training related handshaking between the transmitter 102 and the receiver 104 is carried on the auxiliary channel. An example of a link training pattern is shown in FIG. 11 in accordance with an embodiment of the invention. As illustrated, during the training session, a phase 1 represents the shortest run length while phase 2 is the longest that are used by the receiver to optimize an equalizer. In phase 3, both bit lock and character lock are achieved as long as the link quality is reasonable. Typically, the training period is about 10 ms, in which time, approximately 107 bits of data are sent. If the receiver 104 does not achieve solid lock, it informs the transmitter 102 via the auxiliary channel 224 and the transmitter 102 reduces the link rate and repeats the training session.

In addition to providing a training session conduit, the auxiliary channel 224 can be also used to carry main link packet stream descriptions thereby greatly reducing the overhead of packet transmissions on the main link 222. Furthermore, the auxiliary channel 224 can be configured to carry Extended Display Identification Data (EDID) information replacing the Display Data Channel (DDC) found on all monitors (EDID is a VESA standard data format that contains basic information about a monitor and its capabilities, including vendor information, maximum image size, color characteristics, factory pre-set timings, frequency range limits, and character strings for the monitor name and serial number. The information is stored in the display and is used to communicate with the system through the DDC which sites between the monitor and the PC graphics adapter. The system uses this information for configuration purposes, so the monitor and system can work together). In what is referred to as an extended protocol mode, the auxiliary channel can carry both asynchronous and isochronous packets as required to support additional data types such as keyboard, mouse and microphone.

Figure 12:
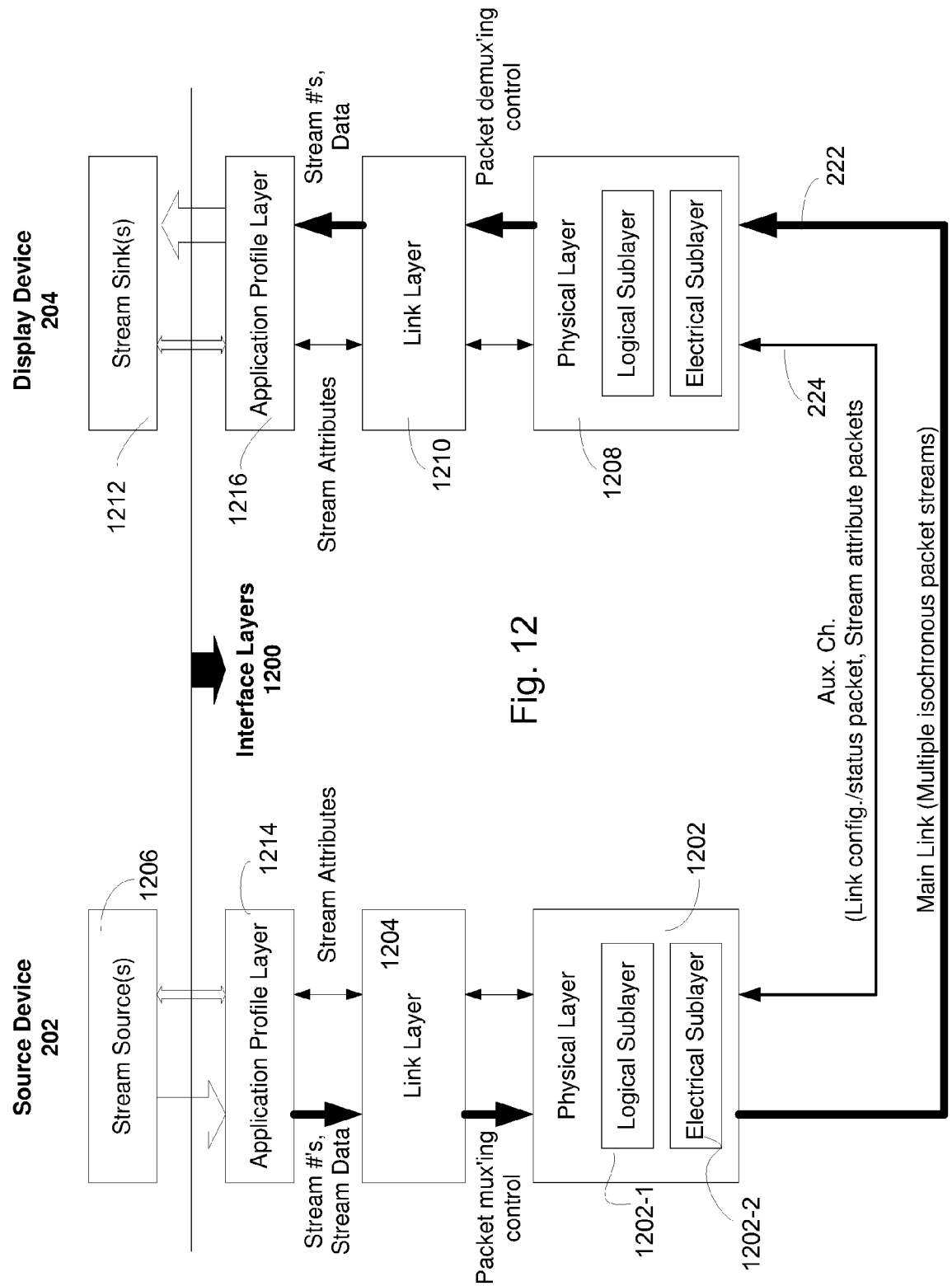
FIG. 12 illustrates a logical layering of the system in accordance with an embodiment of the invention.

FIG. 12 illustrates a logical layering 1200 of the system 200 in accordance with an embodiment of the invention. It should be noted that while the exact implementation may vary depending upon application, generally, a source (such as the video source 202) is formed of a source physical layer 1202 that includes transmitter hardware, a source link layer 1204 that includes multiplexing hardware and state machine (or firmware), and a data stream source 1206 such as Audio/Visual/Graphics hardware and associated software. Similarly, a display device includes a physical layer 1208 (including various receiver hardware), a sink link layer 1210 that includes de-multiplexing hardware and state machine (or firmware) and a stream sink 1212 that includes display/timing controller hardware and optional firmware. A source application profile layer 1214 defines the format with which the source communicates with the link layer 1204 and similarly, a sink application profile layer 1216 defines the format with which the sink 1212 communicates with the sink link layer 1210.

The various layers will now be discussed in more detail.

Figure 14:
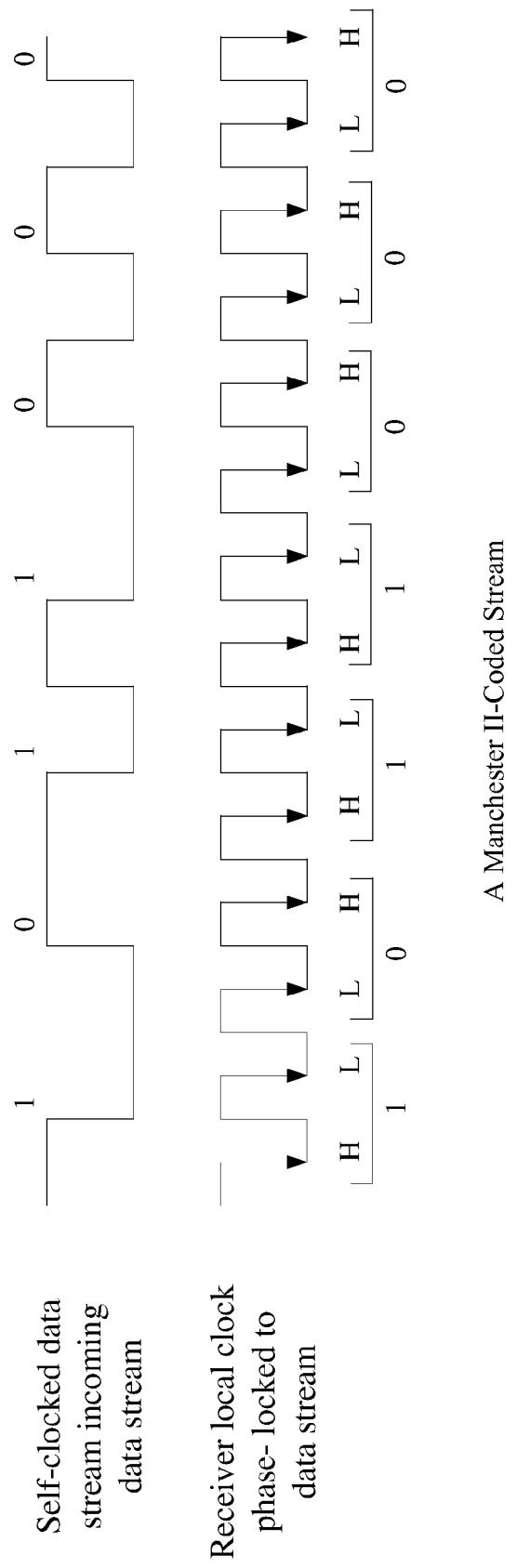
FIG. 14 shows an exemplary Manchester II encoding scheme in accordance with an embodiment of the invention.

In the described embodiment, the source device physical layer 1202 includes an electrical sub layer 1202-1 and a logical sub layer 1202-2. The electrical sub layer 1202-1 includes all circuitry for interface initialization/operation such as hot plug/unplug detection circuit, drivers/receivers/termination resistors, parallel-to-serial/serial-to-parallel conversions, and spread-spectrum-capable PLL's. The logical sub layer 1202-2 includes circuitry for, packetizing/de-packetizing, data scrambling/de-scrambling, pattern generation for link training, time-base recovery circuits, and data encoding/decoding such as 8B/10B (as specified in ANSI X3.230-1994, clause 11) that provides 256 link data characters and twelve control characters (an example of which is shown as FIG. 13) for the main link 222 and Manchester II for the auxiliary channel 224 (see FIG. 14).

It should be noted that the 8B/10B encoding algorithm is described, for example, in U.S. Pat. No. 4,486,739, which is hereby incorporated by reference. As known by those of skill in the art, the 8B/10B code is a block code that encodes 8-bit data blocks into 10-bit code words for serial transmission. In addition, the 8B/10B transmission code converts a byte wide data stream of random 1s and 0s into a DC balanced stream of 1s and 0s with a maximum run length of 5. Such codes provide sufficient signal transitions to enable reliable clock recovery by a receiver, such as transceiver 110. Moreover, a DC balanced data stream proves to be advantageous for fiber optic and electromagnetic wire connections. The average number of 1s and 0s in the serial stream is be maintained at equal or nearly equal levels. The 8B/10B transmission code constrains the disparity between the number of 1s and 0s to be −2, 0, or 2 across 6 and 4 bit block boundaries. The coding scheme also implements additional codes for signaling, called command codes.

It should be noted that in order to avoid the repetitive bit patterns exhibited by uncompressed display data (and hence, to reduce EMI), data transmitted over main link 222 is first scrambled before 8B/10B encoding. All data except training packets and special characters will be scrambled. The scrambling function is implemented with Linear Feedback Shift Registers (LFSRs). When data encryption is enabled, the initial value of an LFSR seed is dependent on an encryption key set. If it is data scrambling without encryption, the initial value will be fixed.

Since data stream attributes are transmitted over the auxiliary channel 224, the main link packet headers serve as stream identification numbers thereby greatly reducing overhead and maximizing link bandwidth. It should also be noted that neither the main link 222 nor the auxiliary link 224 has separate clock signal lines. In this way, the receivers on main link 222 and auxiliary link 224 sample the data and extract the clock from the incoming data stream. Fast phase locking for any phase lock loop (PLLs) circuit in the receiver electrical sub layer is important for since the auxiliary channel 224 is half-duplex bi-directional and the direction of the traffic changes frequently. Accordingly, the PLL on the auxiliary channel receiver phase locks in as few as 16 data periods thanks to the frequent and uniform signal transitions of Manchester II (MII) code At link set up time, the data rate of main link 222 is negotiated using the handshake over auxiliary channel 224. During this process, known sets of training packets are sent over the main link 222 at the highest link speed. Success or failure is communicated back to the transmitter 102 via the auxiliary channel 224. If the training fails, main link speed is reduced and training is repeated until successful. In this way, the source physical layer 1102 is made more resistant to cable problems and therefore more suitable for external host to monitor applications. However, unlike conventional display interfaces, the main channel link data rate is decoupled from the pixel clock rate. A link data rate is set so that link bandwidth exceeds the aggregate bandwidth of the transmitted streams.

The source link layer 1204 handles the link initialization and management. For example, upon receiving a hot plug detect event generated upon monitor power-up or connection of the monitor cable from the source physical layer 1202, the source device link layer 1204 evaluates the capabilities of the receiver via interchange over the auxiliary channel 224 to determine a maximum main link data rate as determined by a training session, the number of time-base recovery units on the receiver, available buffer size on both ends, availability of USB extensions and then notifies the stream source 1206 of an associated hot plug event. In addition, upon request from the stream source 1206, the source link layer 1204 reads the display capability (EDID or equivalent). During a normal operation, the source link layer 1204 sends the stream attributes to the receiver 104 via the auxiliary channel 224, notifies the stream source 1204 whether the main link 222 has enough resource for handling the requested data streams, notifies the stream source 1204 of link failure events such as sync loss and buffer overflow, and sends MCCS commands submitted by the stream source 1204 to the receiver via the auxiliary channel 224. All communications between the source link layer 1204 and the stream source/sink use the formats defined in the application profile layer 1214.

In general, the Application Profile Layer defines formats with which a stream source (or sink) will interface with the associated link layer. The formats defined by the application profile layer are divided into the following categories, Application independent formats (Link Message for Link Status inquiry) and Application dependent formats (main link data mapping, time-base recovery equation for the receiver, and sink capability/stream attribute messages sub-packet formats, if applicable). The Application Profile Layer supports the following color formats 24-bit RGB, 16-bit RG2565, 18-bit RGB, 30-bit RGB, 256-color RGB (CLUT based), 16-bit, CbCr422, 20-bit YCbCr422, and 24-bit YCbCr444.

For example, the display device application profile layer (APL) 1214 is essentially an application-programming interface (API) describing the format for Stream Source/Sink communication over the main link 222 that includes a presentation format for data sent to or received from the interface 100. Since some aspects of the APL 1214 (such as the power management command format) are baseline monitor functions, they are common to all uses of the interface 100. Whereas other non-baseline monitor functions, such as such as data mapping format and stream attribute format, are unique to an application or a type of isochronous stream that is to be transmitted. Regardless of the application, the stream source 1204 queries the source link layer 1214 to ascertain whether the main link 222 is capable of handling the pending data stream(s) prior to the start any packet stream transmission on the main link 222.

When it is determined that the main link 222 is capable of supporting the pending packet stream(s), the stream source 1206 sends stream attributes to the source link layer 1214 that is then transmitted to the receiver over the auxiliary channel 224. These attributes are the information used by the receiver to identify the packets of a particular stream, to recover the original data from the stream and to format it back to the stream's native data rate. The attributes of the data stream are application dependent.

In those cases where the desired bandwidth is not available on the main link 222, the stream source 1214 may take corrective action by, for example, reducing the image refresh rate or color depth.

Figure 15:
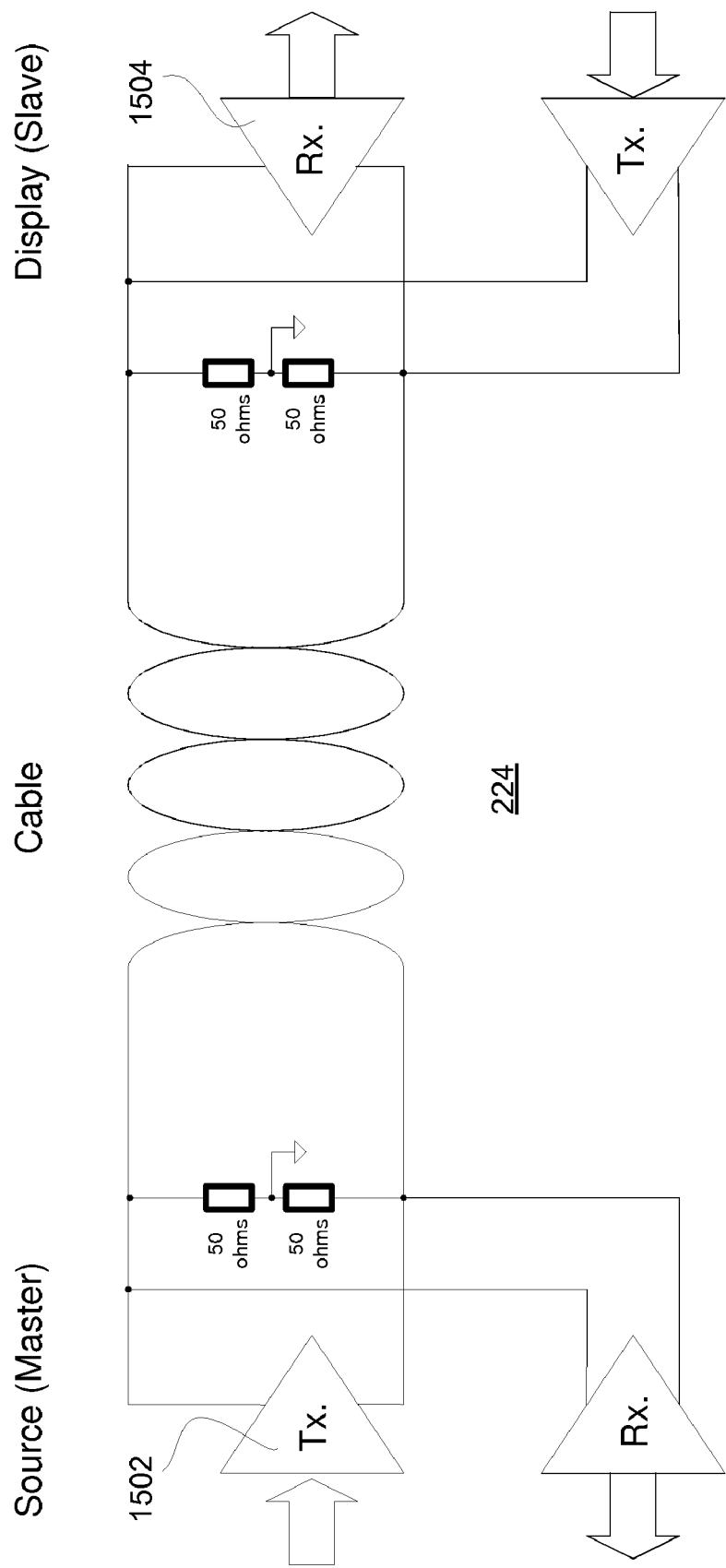
FIG. 15 shows a representative auxiliary channel electrical sub layer in accordance with an embodiment of the invention.

The display device physical layer 1216 isolates the display device link layer 1210 and the display device APL 1216 from the signaling technology used for link data transmission/reception. The main link 222 and the auxiliary channel 224 have their own physical layers, each consisting of a logical sub layer and an electrical sub layer that includes the connector specification. For example, the half-duplex, bi-directional auxiliary channel 224 has both a transmitter and a receiver at each end of the link as shown in FIG. 15. An auxiliary link transmitter 1502 is provided with link characters by a logical sub layer 1208-1 that are then serialized serialized and transmitted to a corresponding auxiliary link receiver 1504. The receiver 1504, in turn, receives serialized link character from the auxiliary link 224 and de-serializes the data at a link character clock rate. It should be noted that the major functions of the source logical sub layers include signal encoding, packetizing, data scrambling (for EMI reduction), and training pattern generation for the transmitter port. While for the receiver port, the major functions of the receiver logical sub layer includes signal decoding, de-packetizing, data de-scrambling, and time-base recovery.

The major functions of auxiliary channel logical sub layer include data encoding and decoding, framing/de-framing of data and there are two options in auxiliary channel protocol: standalone protocol (limited to link setup/management functions in a point-to-point topology) is a lightweight protocol that can be managed by the Link Layer state-machine or firmware and extended protocol that supports other data types such as USB traffic and topologies such as daisy-chained sink devices. It should be noted that the data encoding and decoding scheme is identical regardless of the protocol whereas framing of data differs between the two. Still referring to FIG. 15, the auxiliary channel electrical sub layer contains the transmitter 1502 and the receiver 1504. The transmitter 1502 is provided with link characters by the logical sub layer, which it serializes and transmits out. The receiver 1504 receives serialized link character from the link layer and subsequently de-serializes it at link character clock rate. The positive and negative signals of auxiliary channel 224 are terminated to ground via 50-ohm termination resistors at each end of the link as shown. In the described implementation, the drive current is programmable depending on the link condition and ranges from approximately 8 mA to approximately 24 mA resulting in a range of Vdifferential_pp of approximately 400 mV to approximately 1.2V. In electrical idle modes, neither the positive nor the negative signal is driven. When starting transmission from the electrical idle state, the SYNC pattern must be transmitted and the link reestablished. In the described embodiment, the SYNC pattern consists of toggling a auxiliary channel differential pair signals at clock rate 28 times followed by four 1's in Manchester II code. The auxiliary channel master in the source device detects hot-plug and hot-unplug events by periodically driving or measuring the positive and negative signals of auxiliary channel 224.

Figure 16:
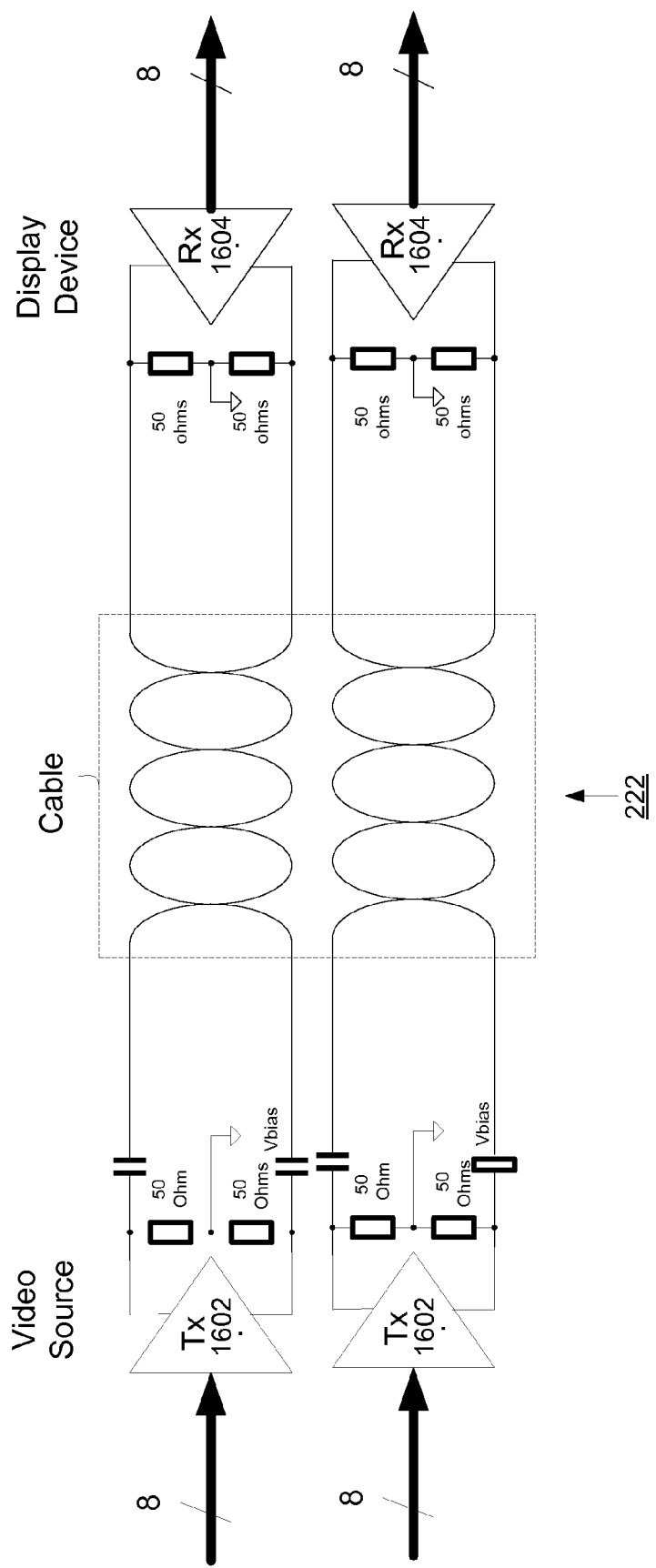
FIG. 16 shows a representative main link electrical sub layer in accordance with an embodiment of the invention.

In the described embodiment, the main link 222 supports discrete, variable link rates that are integer multiples of the local crystal frequency (see FIG. 3 for a representative set of link rates consonant with a local crystal frequency of 24-MHz). As shown in FIG. 16, the main link 222 (being a unidirectional channel) has only a transmitter 1602 at the source device and only a receiver 1604 at the display device.

Figure 17:
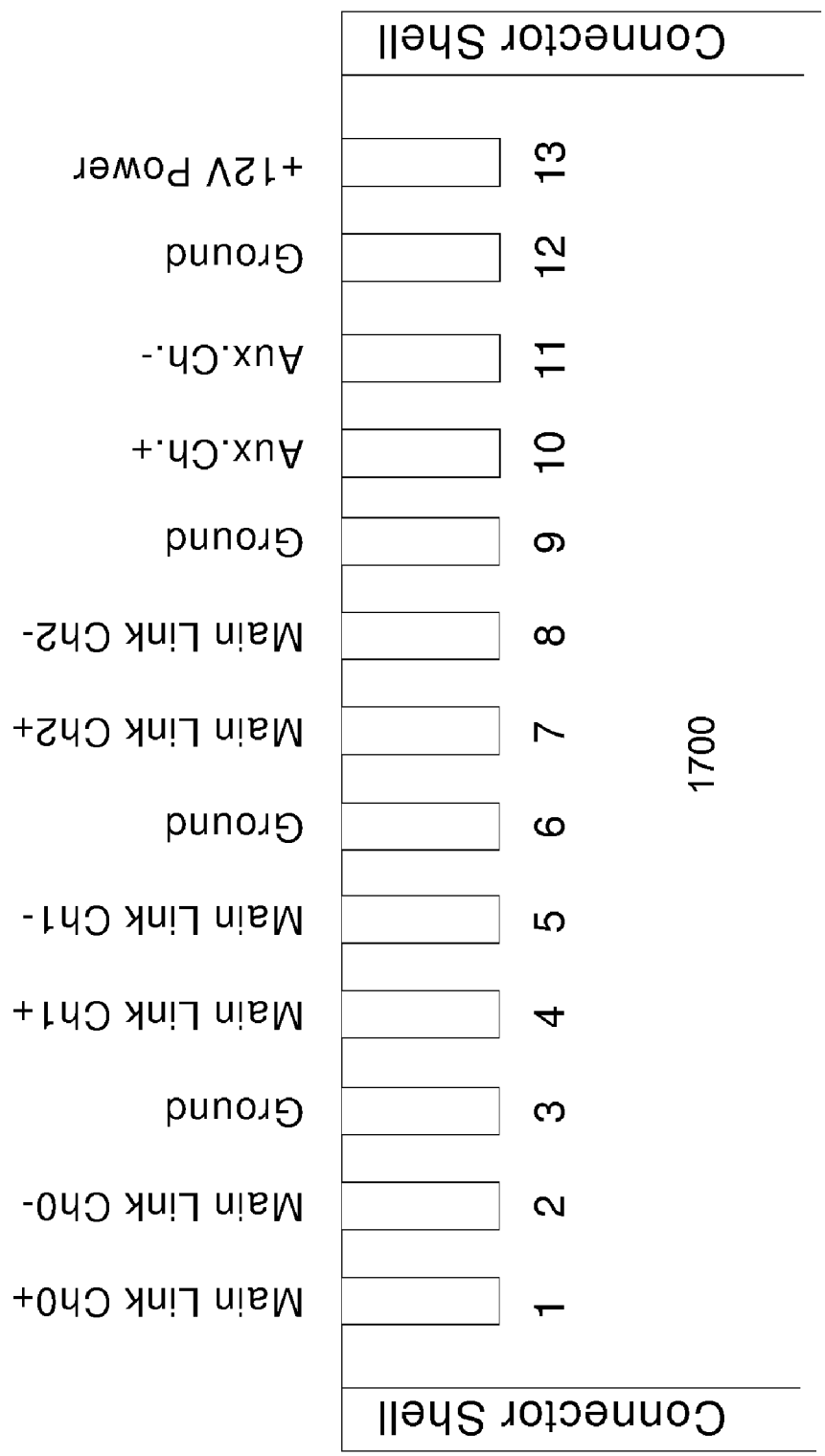
FIG. 17 shows a representative connector in accordance with an embodiment of the invention.

As shown, the cable 1604 takes the form includes a set of twisted pair wires, one for each of the Red (R), Green (G), and Blue (B) video signals provides in a typical RGB color based video system (such as PAL based TV systems). As known by those of skill in the art, twisted pair cable is a type of cable that consists of two independently insulated wires twisted around one another. One wire carries the signal while the other wire is grounded and absorbs signal interference. It should be noted that in some other systems, the signals could also be component based signals (Pb, Pr, Y) used for NTSC video TV systems. Within the cable, each twisted pair is individually shielded. Two pins for +12V power and ground are provided. The characteristics impedance of each differential pair is 100 ohms+/−20%. The entire cable is also shielded. This outer shield and individual shields are shorted to the connector shells on both ends. The connector shells are shorted to ground in a source device. A connector 1700 as shown in FIG. 17 has 13 pins in one row having a pinout that is identical both for the connector on the source device end and that on the display device end. The source device supplies the power.

The main link 222 is terminated on both ends and since the main link 222 is AC coupled, the termination voltage can be anywhere between 0V (ground) to +3.6V. In the described implementation, the drive current is programmable depending on the link condition and ranges from approximately 8 mA to approximately 24 mA resulting in a range of Vdifferential_pp of approximately 400 mV to approximately 1.2V. The minimum voltage swing is selected for each connection using a training pattern. An electrical idle state is provided for power management modes. In electrical idle, neither the positive nor the negative signals are driven. When starting a transmission from electrical idle state, the transmitter must conduct a training session in order re-establish the link with the receiver.

Figure 18:
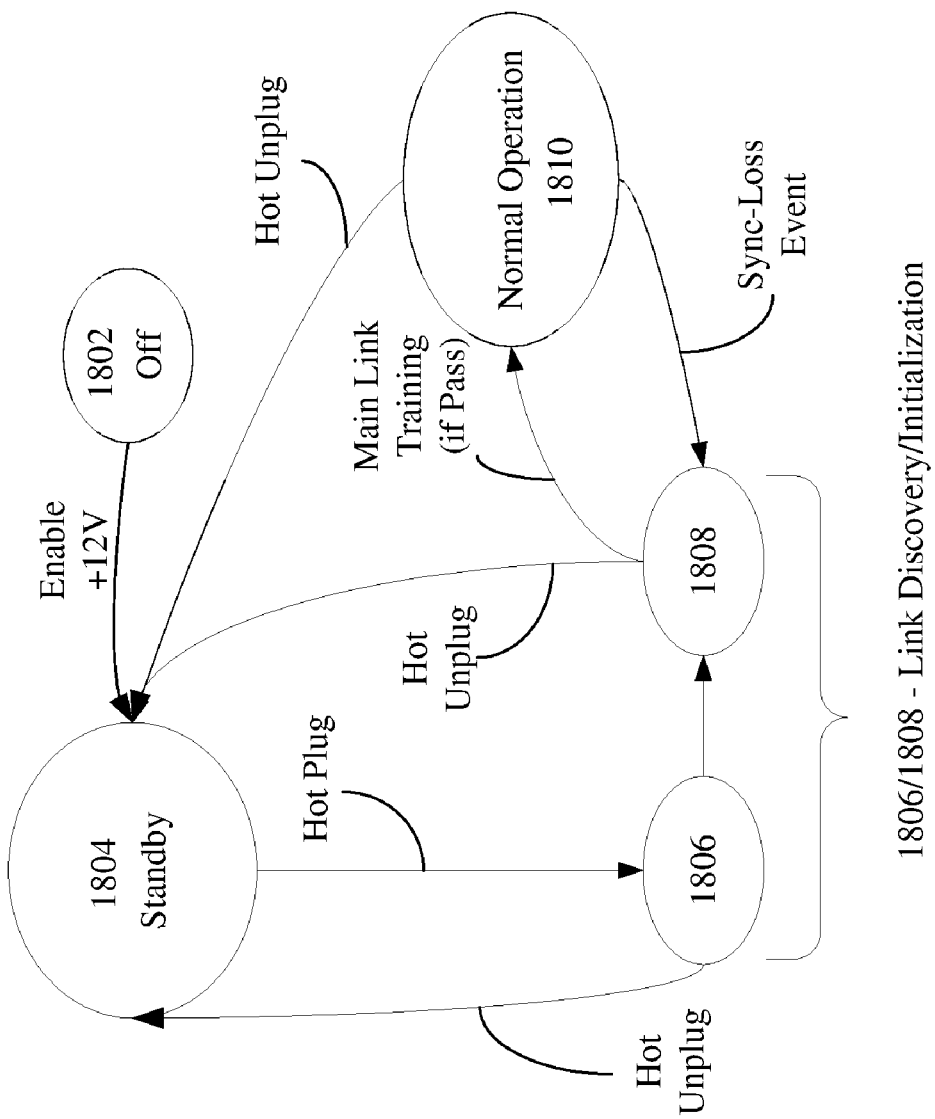
FIG. 18 shows a source state diagram in accordance with an embodiment of the invention.

The invention will now be described in terms of state diagrams shown in FIGS. 18 and 19 described below. Accordingly, FIG. 18 shows the source state diagram described below. At an off state 1802, the system is off such that the source is disabled. If the source is enabled, then the system transitions to a standby state 1804 suitable for power saving and receiver detection. In order to detect whether or not the receiver is present (i.e., hot plug/play), the auxiliary channel is periodically pulsed (such as for 1 us every 10 ms) and a measure of a voltage drop across the termination resistors during the driving is measured. If it is determined that a receiver is present based upon the measured voltage drop, then the system transitions to a detected receiver state 1806 indicating that a receiver has been detected, i.e, a hot plug event has been detected. If, however, there is no receiver detected, then the receiver detection is continued until such time, if ever, a receiver is detected or a timeout has elapsed. It should be noted that in some cases the source device may choose to go to "OFF" state from which no further display detection is attempted.

If at the state 1806 a display hot unplug event is detected, then the system transitions back to the standby state 1804. Otherwise the source drives the auxiliary channel with a positive and negative signal to wake up receiver and the receiver's subsequent response, if any, is checked. If there is no response received, then the receiver has not woken up and source remains in the state 1806. If, however, a signal is received from the display, then the display has woken up and the source is ready read the receiver link capabilities (such as max link rate, buffer size, and number of time-base recovery units) and the system transitions to a main link initialization state 1808 and is ready to commence a training start notification phase.

At this point, a training session is started by sending a training pattern over the main link at a set link rate and checks an associated training status. The receiver sets a pass/fail bit for each of three phases and the transmitter will proceed to the next phase upon detection of pass only such that when a pass is detected, the main link is ready at that link rate. At this point, the interface transitions to a normal operation state 1510, otherwise, the link rate is reduced and the training session is repeated. During the normal operation state 1810, the source continues to periodically monitor a link status index, which if fails, a hot unplug event is detected and the system transitions to the standby state 1804 and waits for a hot plug detection event. If, however, a sync loss is detected, then the system transitions to state 1808 for a main link re-initiation event.

Figure 19:
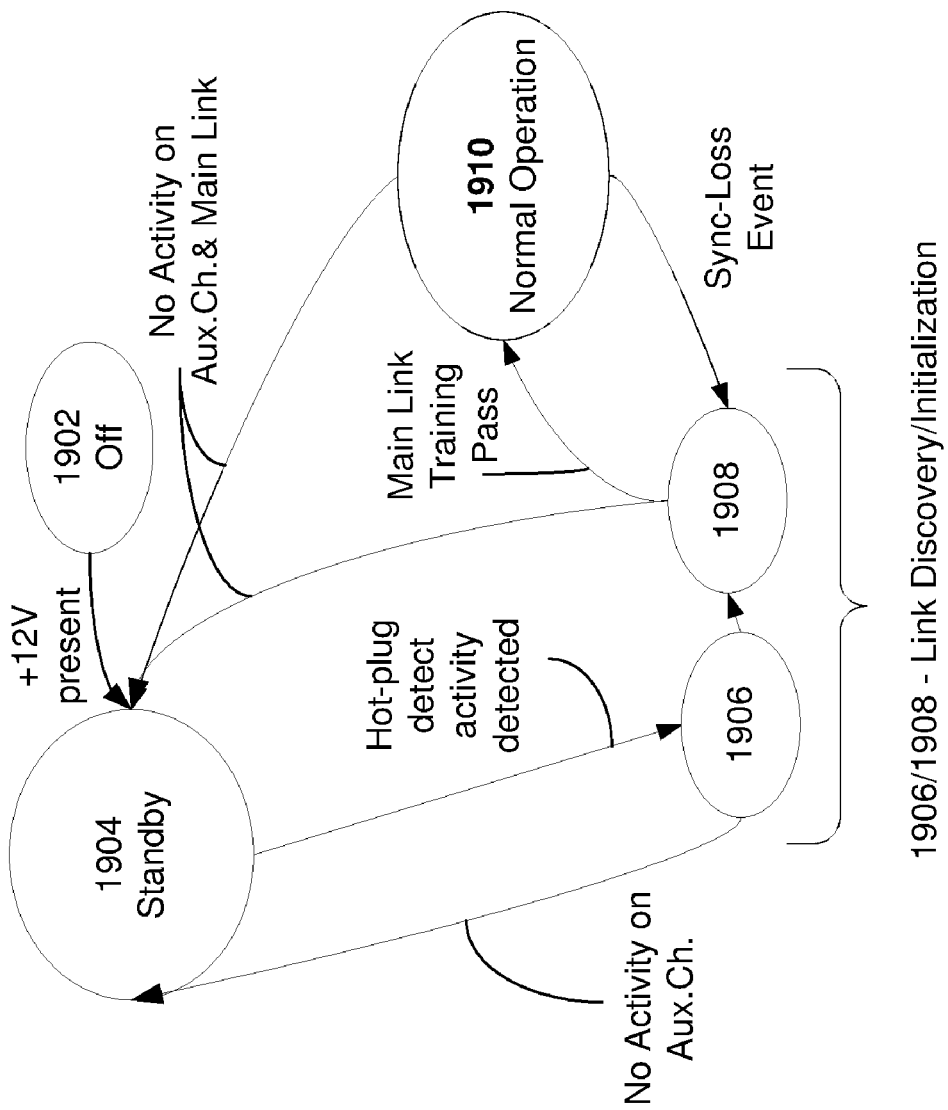
FIG. 19 shows a display state diagram in accordance with an embodiment of the invention.

FIG. 19 shows the display state diagram 1900 described below. At a state 1902, no voltage is detected, the display goes to an OFF state. At a standby mode state 1904, both main link receiver and auxiliary channel slave are in electrical idle, a voltage drop across the termination resistors of auxiliary channel slave port are monitored for a predetermined voltage. If the voltage is detected, then the auxiliary channel slave port is turned on indicating a hot plug event and the system moves to a display state 1906, otherwise, the display remains in the standby state 1904. At the state 1906 (main link initialization phase), if a display is detected, then the auxiliary slave port is fully turned on, and the transmitter responds to a receiver link capability read command and the display state transitions to 1908, otherwise, if there is no activity on the auxiliary channel for more than a predetermined period of time then the auxiliary channel slave port is put into the to standby state 1904.

During a training start notification phase, the display responds to the training initiation by the transmitter by adjusting the equalizer using training patterns, updating the result for each phase. If the training fails, then wait for another training session and if the training passes, then go to normal operation state 1910. If there is no activity on the auxiliary channel or on the main link (for training) for more than a predetermined (10 ms, for example), the auxiliary channel slave port is set to the standby state 1904.

FIGS. 20-24 show particular implementations of the cross platform display interface.

Figure 20:
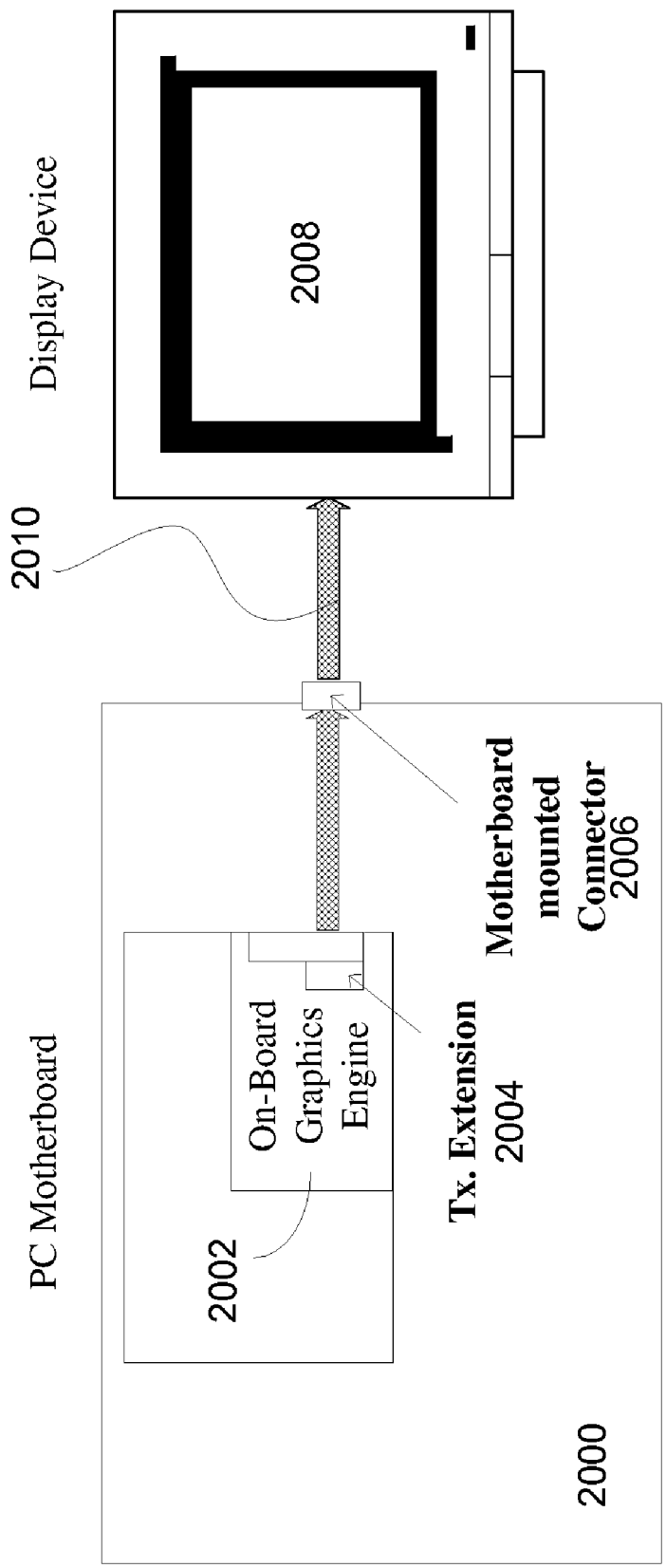
FIGS. 20-24 illustrate various computer based implementations of the invention.

FIG. 20 shows a PC motherboard 2000 having an on-board graphics engine 2002 that incorporates a transmitter 2004 in accordance with the invention. It should be noted that the transmitter 2004 is a particular example of the transmitter 102 shown in FIG. 1. In the described embodiment, the transmitter 2004 is coupled to an connector 2006 (along the lines of the connector 1700) mounted on the motherboard 2000 which in turn is connected to a display device 2008 by way of a twisted pair cable 2010 couples a display device 2010.

As known in the art, PCI Express (developed by Intel Corporation of Santa Clara, Calif.) is a high-bandwidth, low pin count, serial, interconnect technology that also maintains software compatibility with existing PCI infrastructure. In this configuration, the PCI Express port is augmented to become compliant with the requirements of the cross platform interface which can directly drive a display device either using a motherboard mounted connector as shown.

Figure 21:
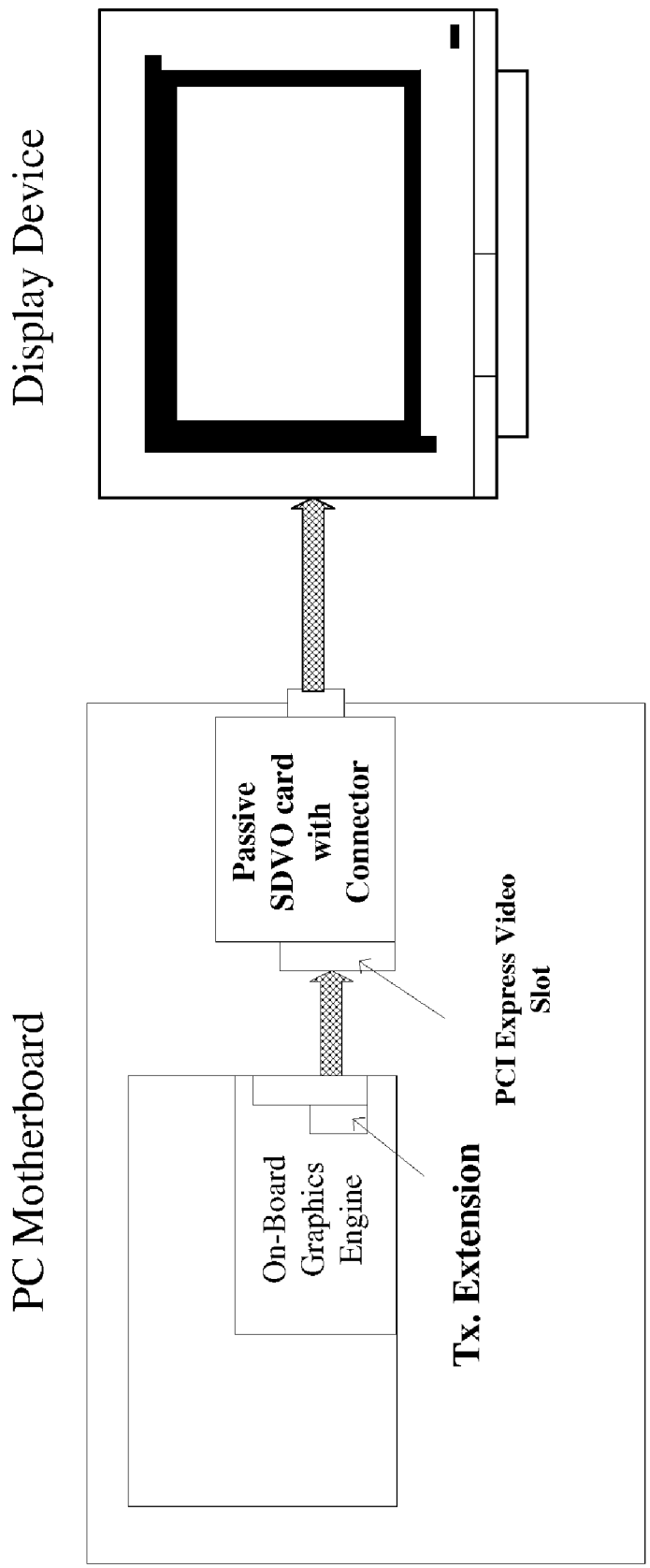
Figure 22:
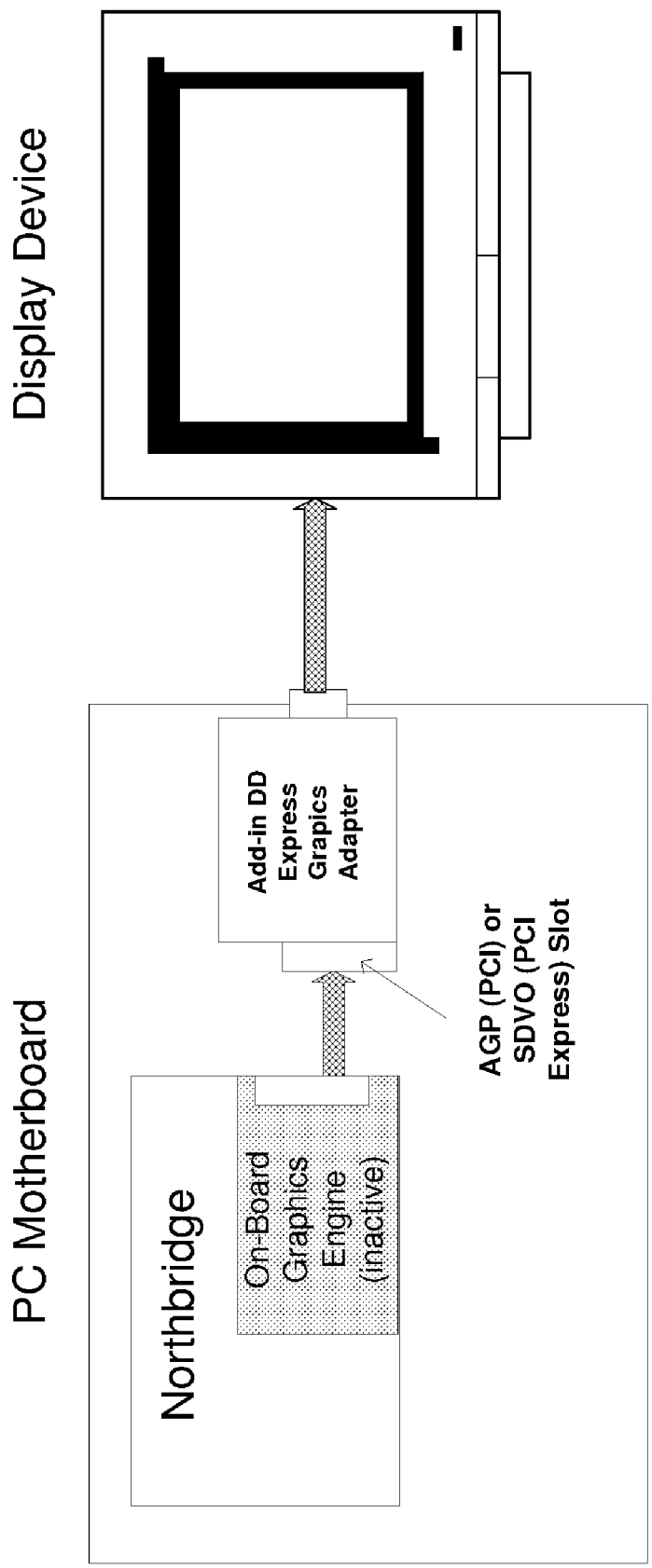
Figure 23:
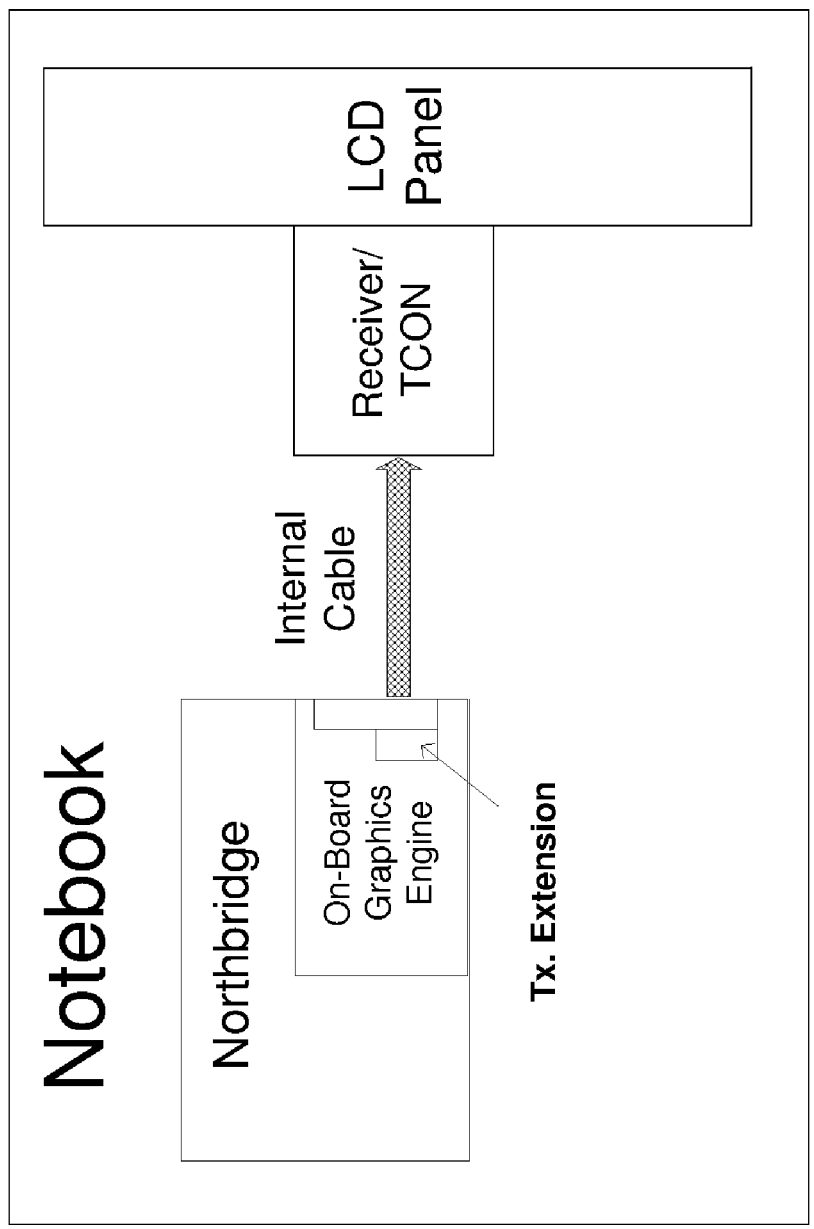

In situations where it is not practical to mount the connector on the motherboard, the signals can be routed through the SDVO slot of the PCI Express motherboard and brought to the back of the PC using a passive card connector as shown in FIG. 21. As is the case with the current generation of add-in graphics cards, an add-in graphics card can supplant the onboard graphics engine as shown in FIG. 23.

Figure 24:
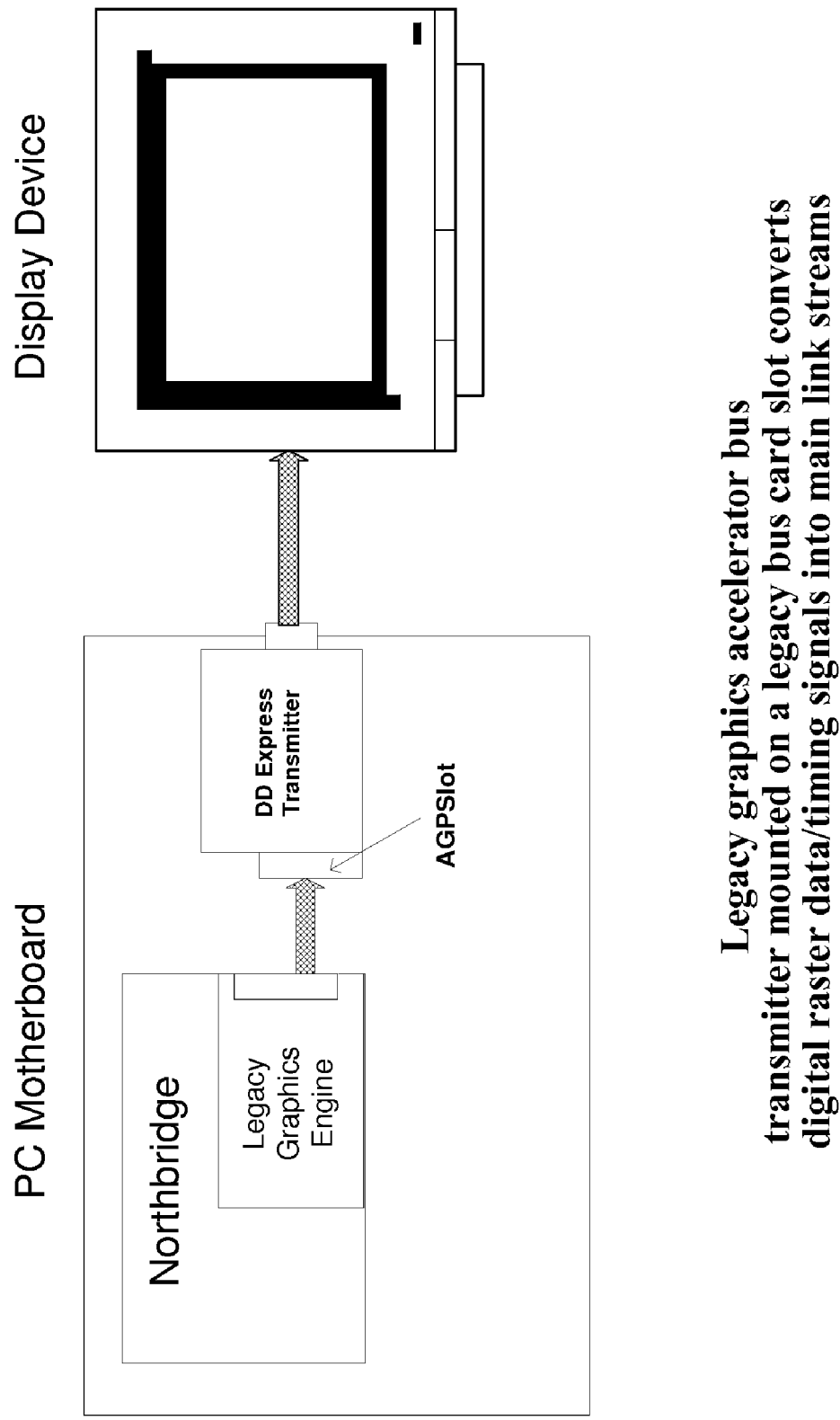

In the case of notebook applications, the transmitter on the motherboard graphics engine would drive through internal cabling, an integrated receiver/TCON which would drive the panel directly. For the most cost effective implementation, the receiver/TCON would be mounted on the panel thereby reducing the number of interconnect wires to 8 or 10 as shown in FIG. 24

All of the above examples assume integrated transmitters. However, is it quite feasible to implement as a standalone transmitter integrating into PCI and PCI Express environments through the AGP or SDVO slots, respectively. A standalone transmitter will enable output streams without any change in graphics hardware or software.

The methodology of the invention will now be described in terms of a number of flowcharts each describing a particular process for enabling the invention. Specifically, FIGS. 25-29 describe a number of interrelated processes that when used singly or in any combination described aspects of the invention.

Figure 25:
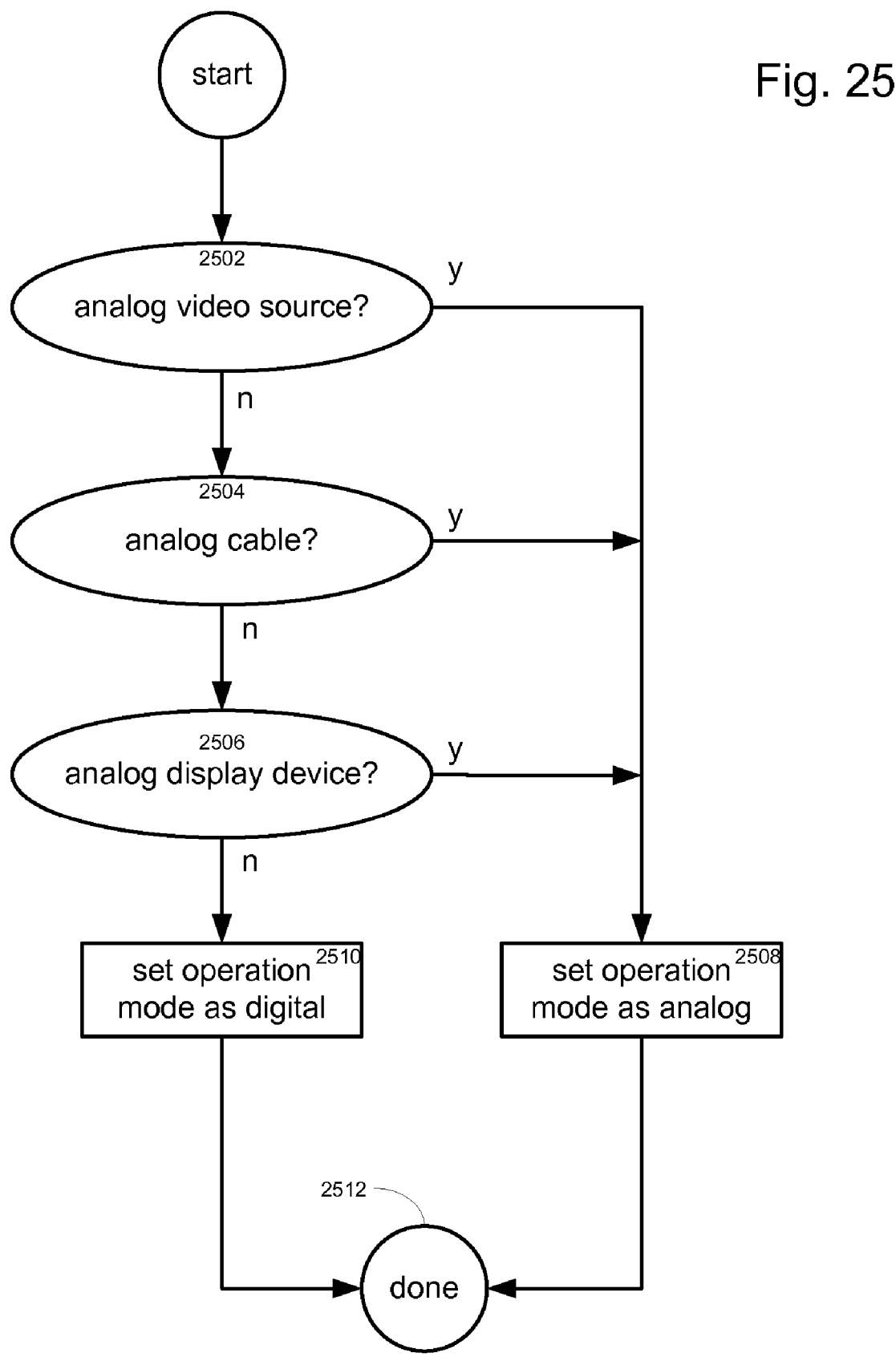
FIG. 25 shows a flowchart detailing a process for determining an operational mode of the interface in accordance with an embodiment of the invention.

FIG. 25 shows a flowchart detailing a process 2500 for determining an operational mode of the interface 100 in accordance with an embodiment of the invention. In this process, the operational mode will only be set to a digital mode if the video source and the display device are both digital. Otherwise, the operational mode will be set to analog mode. It should be noted that "analog mode" in this context can include both conventional VGA mode as well as enhanced analog mode having differential analog video with embedded alignment signal and bi-directional sideband. This enhanced analog mode will be described below.

In step 2502, a video source is interrogated to determine whether the video source supports analog or digital data. If the video source supports only analog data, the operational mode of coupling device 100 will be set to analog (step 2508), then the process will end (step 2512).

If the video source can output digital data, the process continues to step 2506. The display device is then interrogated to determine whether the display device is configured to receive digital data. If the display device supports only analog data, the operational mode of coupling device will be set to analog (step 2508), then the process will end (step 2512). Otherwise, the operational mode of the coupling device is set to digital (step 2510). For example, a processor may control switches within the coupling device to set the mode to digital. In general, the coupling device is configured to operate in a fully digital mode only when both the video source and the video sink are operating in a corresponding digital mode.

Figure 26:
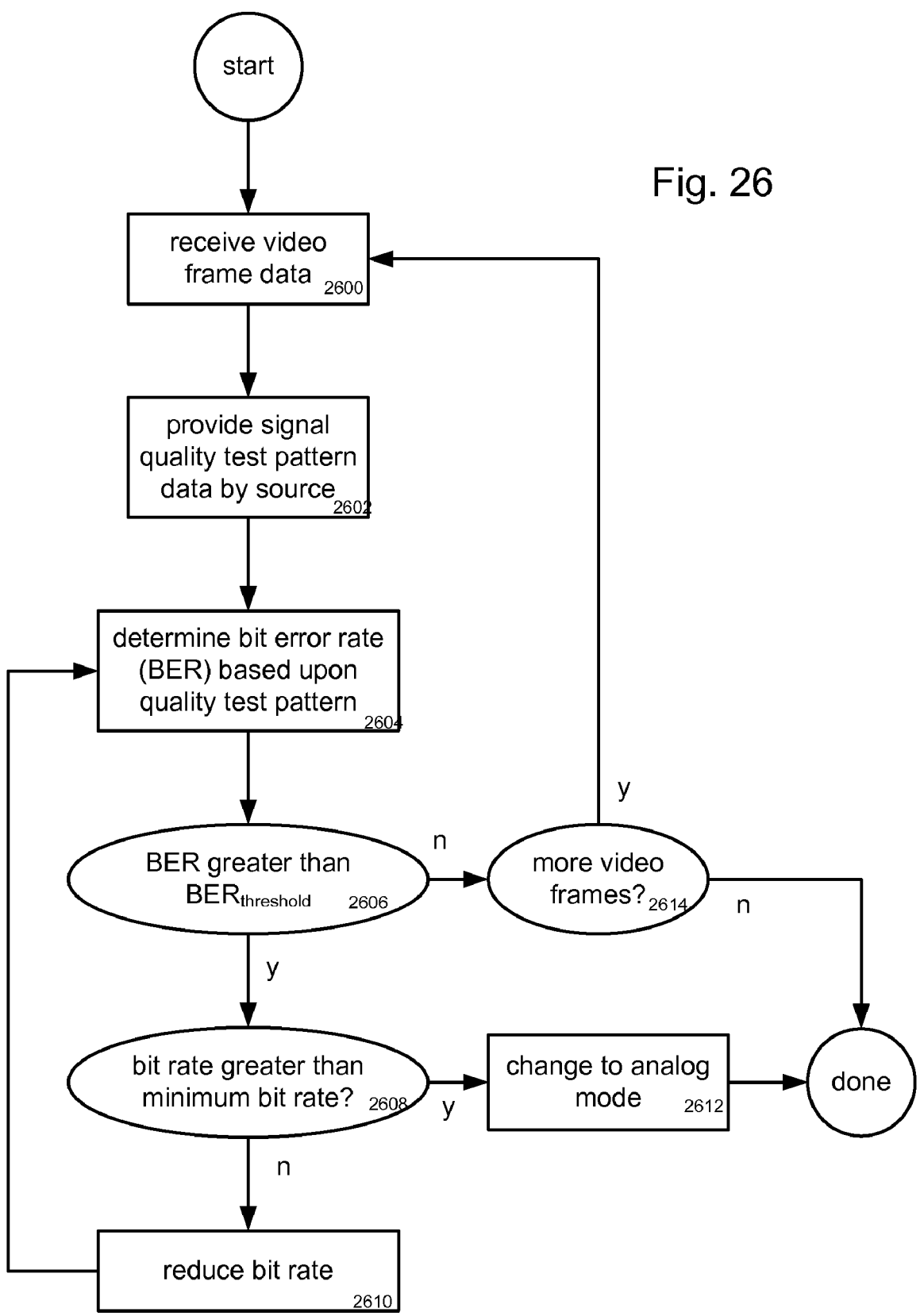
FIG. 26 shows a flowchart detailing a process for providing a real time video image quality check in accordance with some aspects of the invention.

FIG. 26 shows a flowchart detailing a process 2600 for providing a real time video image quality check in accordance with some aspects of the invention. In this example, all determinations of process 2600 are made by a processor coupled to the display interface.

In step 2600, a video signal is received from a video source. Next, a signal quality test pattern is provided by the video source associated with the received video signal (step 2602). In step 2604, a determination of a bit error rate is made, based upon the quality test pattern. Then, a determination is made of whether the bit error rate is greater than a threshold value (step 2606). If the bit error rate is determined to not be greater than the threshold value, then a determination is made (step 2614) of whether or not there are more video frames. If it is determined that there are more video frames, then the process returns to step 2600. Otherwise, the process ends.

However, if the bit error rate is determined to be greater than the threshold value in step 2606, a determination is made (step 2608) as to whether the bit rate is greater than a minimum bit rate. If the bit rate is greater than a minimum bit rate, then the bit rate is lowered (step 2610) and the process returns to step 2606. If the bit rate is not greater than the minimum bit rate, then the mode is changed to analog mode (step 2612) and the process ends.

Figure 27A:
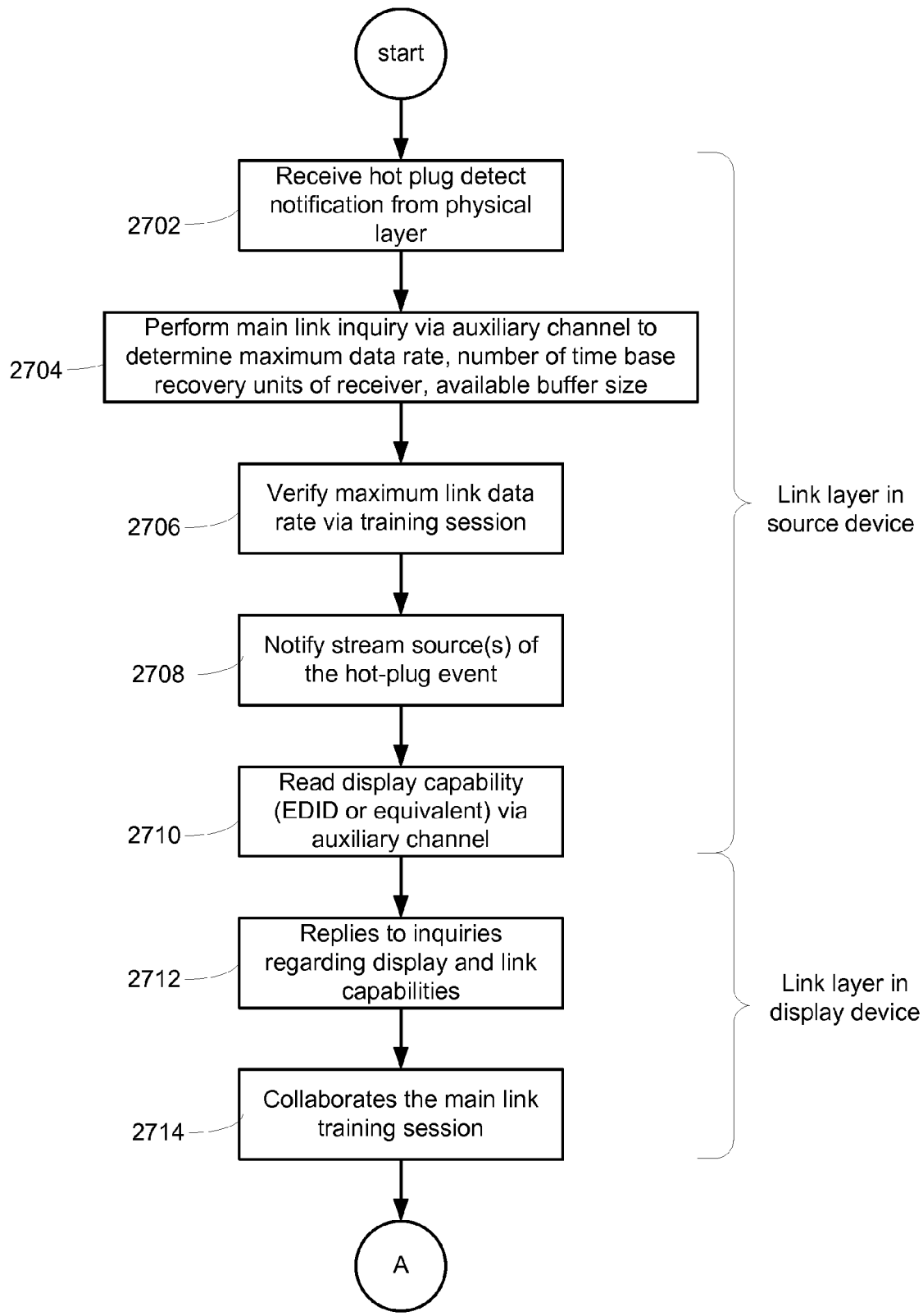
FIG. 27 shows a flowchart for a link set up process in accordance with an embodiment of the invention.
Figure 27B:
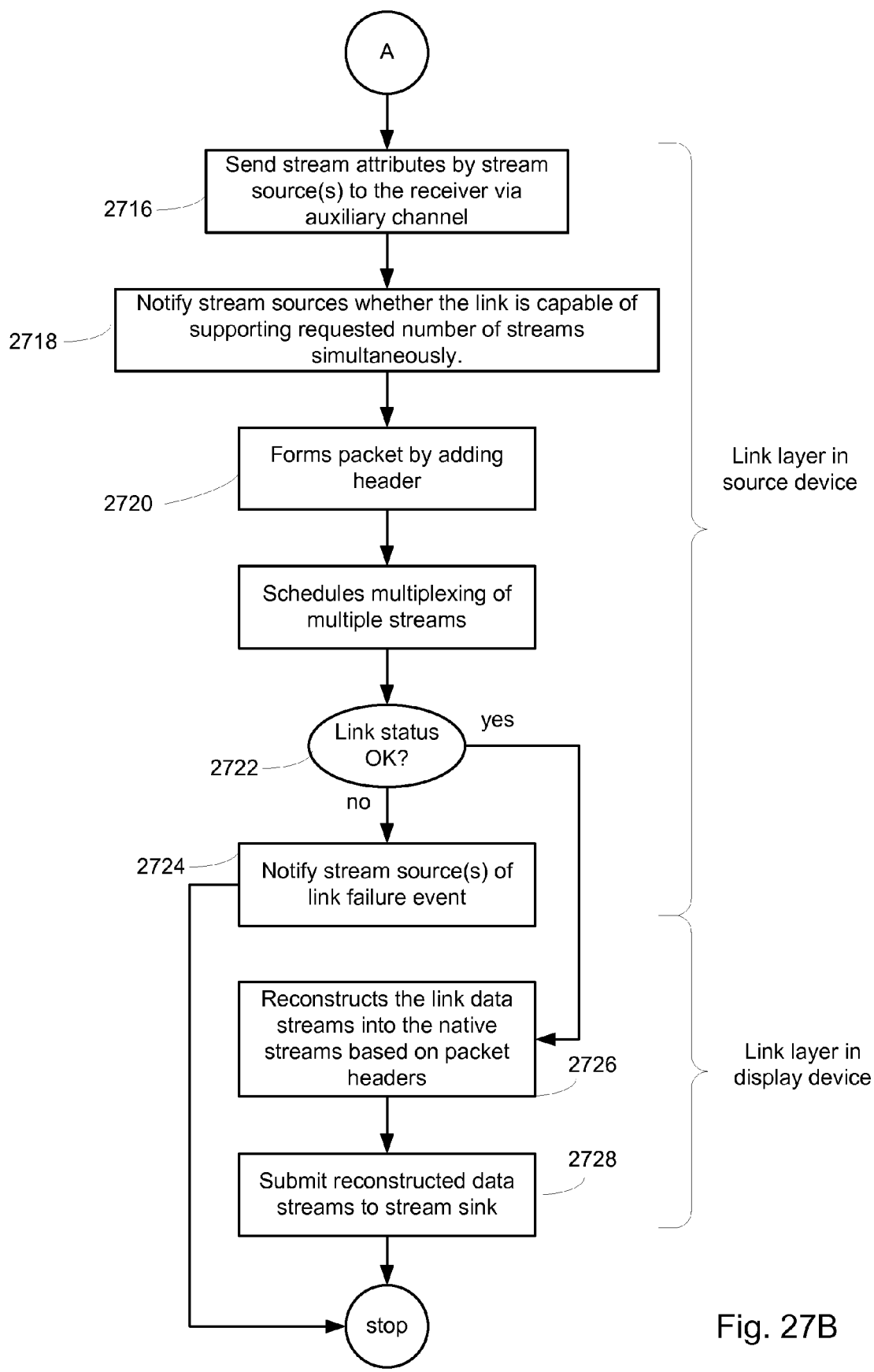

FIG. 27 shows a flowchart for a link set up process 2700 in accordance with an embodiment of the invention. The process 2700 begins at 2702 by the receiving of a hot plug detection event notification. At 2704 a main link inquiry is made by way of an associated auxiliary channel to determine a maximum data rate, a number of time base recovery units included in a receiver, and available buffer size. Next, at 2706, the maximum link data rate is verified by way of a training session and at 2708, a data stream source is notified of the hot plug event. At 2710, the capabilities of the display (using EDID, for example) are determined by way of the auxiliary channel and the display responds to the inquiries at 2712 which, in turn, results a collaboration of the main link training session at 2714.

Next, at 2716, the stream source sends stream attributes to the receiver by way of the auxiliary channel and at 2718, the stream sources are further notified whether the main link is capable of supporting the requested number of data streams at 2720. At 2722, the various data packets are formed by adding associated packet headers and the multiplexing of a number of source streams is scheduled at 2724. At 2726 a determination is made whether or not the link status is OK. When the link status is not OK, then the source(s) are notified of a link failure event at 2728, otherwise, the link data streams are reconstructed into the native streams based upon the various packet headers at 2730. At 2732, the reconstructed native data streams are then passed to the display device.

Figure 28:
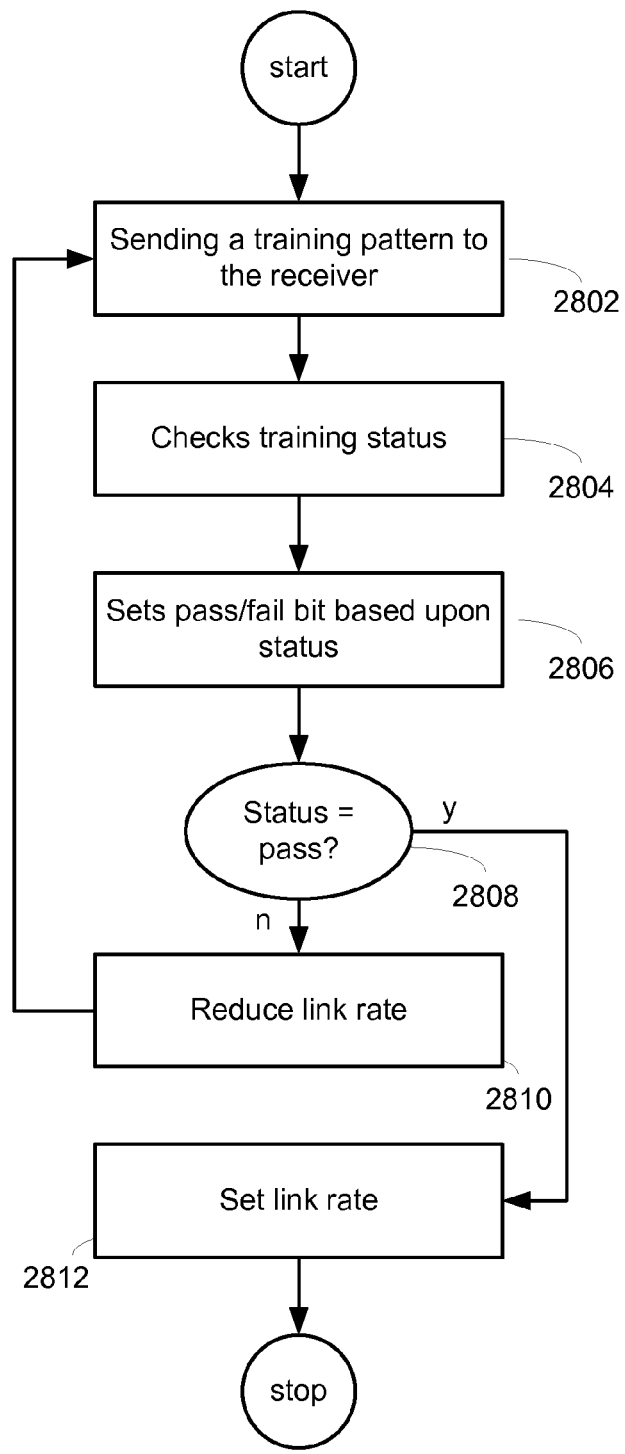
FIG. 28 shows a flowchart detailing a process for performing a training session in accordance with an embodiment of the invention.

FIG. 28 shows a flowchart detailing a process 2800 for performing a training session in accordance with an embodiment of the invention. It should be noted that the training session process 2800 is one implementation of the operation 2506 described in FIG. 25. A training session is started at 2802 by sending a training pattern over the main link at a set link rate to the receiver. A typical link training pattern is shown in FIG. 11 in accordance with an embodiment of the invention. As illustrated, during the training session, a phase 1 represents the shortest run length while phase 2 is the longest. The receiver is to use these two phases to optimize the equalizer. In phase 3, both bit lock and character lock are achieved as long as the link quality is reasonable. At 2804, the receiver checks an associated training status and based upon the training status check, the receiver sets a pass/fail bit for each of three phases and the transmitter at 2806. At each phase, the receiver will proceed to the next phase upon detection of pass only and at 2810 and if the receiver does not detect a pass then the receiver reduces the link rate and repeats the training session. The main link is ready at that link rate at which a pass is detected at 2812.

Figure 29:
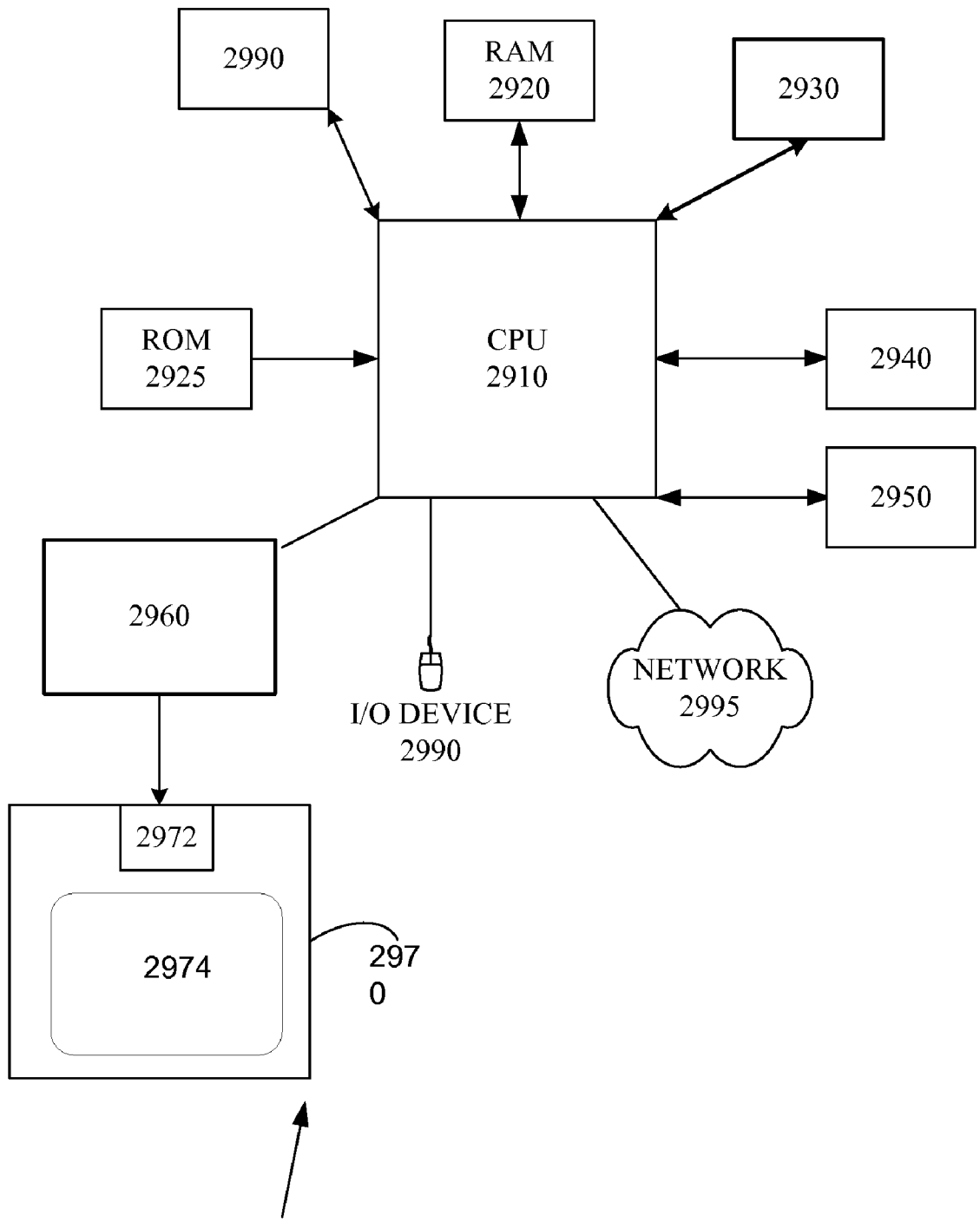
FIG. 29 illustrates a computer system employed to implement the invention.

FIG. 29 illustrates a computer system 2900 employed to implement the invention. Computer system 2900 is only an example of a graphics system in which the present invention can be implemented. Computer system 2900 includes central processing unit (CPU) 1510, random access memory (RAM) 2920, read only memory (ROM) 2925, one or more peripherals 2930, graphics controller 2960, primary storage devices 2940 and 2950, and digital display unit 2970. As is well known in the art, ROM acts to transfer data and instructions uni-directionally to the CPUs 2910, while RAM is used typically to transfer data and instructions in a bi-directional manner. CPUs 2910 may generally include any number of processors. Both primary storage devices 2940 and 2950 may include any suitable computer-readable media. A secondary storage medium 880, which is typically a mass memory device, is also coupled bi-directionally to CPUs 2910 and provides additional data storage capacity. The mass memory device 880 is a computer-readable medium that may be used to store programs including computer code, data, and the like. Typically, mass memory device 880 is a storage medium such as a hard disk or a tape which generally slower than primary storage devices 2940, 2950. Mass memory storage device 880 may take the form of a magnetic or paper tape reader or some other well-known device. It will be appreciated that the information retained within the mass memory device 880, may, in appropriate cases, be incorporated in standard fashion as part of RAM 2920 as virtual memory.

CPUs 2910 are also coupled to one or more input/output devices 890 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPUs 2910 optionally may be coupled to a computer or telecommunications network, e.g., an Internet network or an intranet network, using a network connection as shown generally at 2995. With such a network connection, it is contemplated that the CPUs 2910 might receive information from the network, or might output information to the network in the course of performing the above-described method steps. Such information, which is often represented as a sequence of instructions to be executed using CPUs 2910, may be received from and outputted to the network, for example, in the form of a computer data signal embodied in a carrier wave. The above-described devices and materials will be familiar to those of skill in the computer hardware and software arts.

Graphics controller 2960 generates analog image data and a corresponding reference signal, and provides both to digital display unit 2970. The analog image data can be generated, for example, based on pixel data received from CPU 2910 or from an external encode (not shown). In one embodiment, the analog image data is provided in RGB format and the reference signal includes the VSYNC and HSYNC signals well known in the art. However, it should be understood that the present invention can be implemented with analog image, data and/or reference signals in other formats. For example, analog image data can include video signal data also with a corresponding time reference signal.

Figure 30:
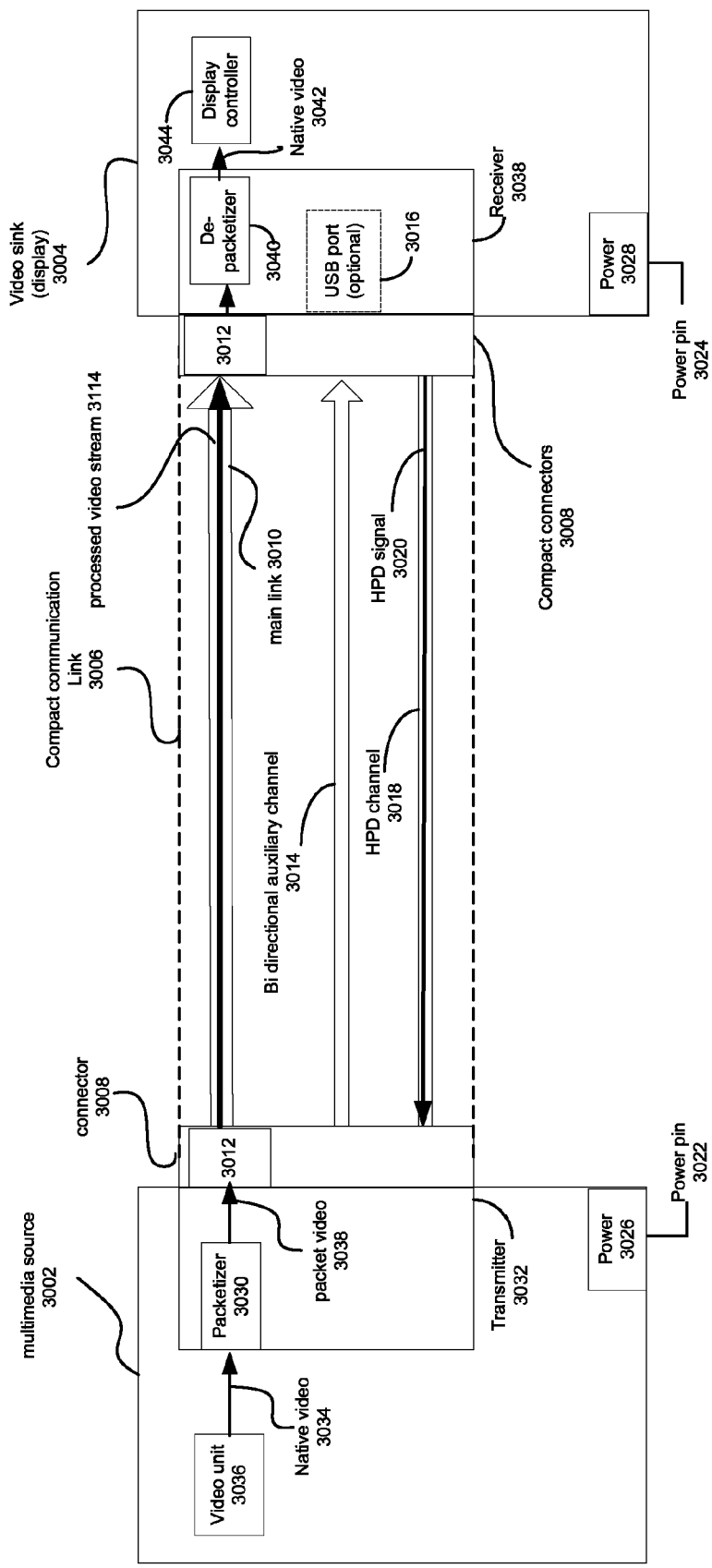
FIG. 30 illustrates a system based upon the system shown in FIG. 1 that is used to connect multimedia source to multimedia sink (display) that includes a video processing unit.

FIG. 30 illustrates system 3000 based upon the system 100 shown in FIG. 1 that is used to connect multimedia source 3002 to multimedia sink (display) 3004 by way of communication link 3006 by way of connectors (source side connector 3008 and/or display side connector 3010). In the described embodiment, one (or both) connectors 3008 or 3010 can include video processor unit 3012 arranged to process video data received from multimedia source 3002 prior to being passed by way of communication link 3006 to multimedia sink 3004. It should be noted, however, that video processing unit 3012 can also be incorporated into source side connector 3008 in addition to or in place of source side connector 3010.

Although the following discussion describes a source side video enhancement unit, it should be noted that the discussion that follows also applies to a display side video processing unit as well. In the described embodiment, video processing unit 3012 processes video data received from multimedia source 3002 prior to being passed by way of communication link 3006 to display 3004. Multimedia source 3002 can take the form of a video device (DVD player, video multi-media player, and so on) that can support video formats such as 480(i,p), 720p, 1080(i,p) and so on. Communication link 3006 can also include half duplex, bi-directional auxiliary channel 3014 capable of supporting data transmission rates up to at least 480 Mbs using a self-clocked data signal (based upon Manchester II channel coding, for example) providing an optional USB compatible data link. Therefore, in those cases where display 3004 is USB compatible (i.e., includes an optional USB port 3016), auxiliary channel 3014 can provide a USB compatible conduit between multimedia source 3002 and display 3004. In this way, any of a number of USB related transactions (such as file transfers) between multimedia source 3002 and display 3004 can be accommodated. In addition, hot plug detect (HPD) channel 3018 provides a conduit to carry HPD signal 3020 that can be used for hot swapping.

In the described embodiment, the auxiliary channel master in the form of multimedia source 3002 detects hot-plug and hot-unplug events by periodically driving (or measuring) positive and negative signals of auxiliary channel 3014. Power pins 3022 and 3024 provide an interface from multimedia source and display internal power supplies 3026 and 3028 respectively that can be used to power a dongle (repeater, interface converter, etc.). In the described embodiment, internal power supplies 3026 and 3028 can provide power on the order of 1.0 W or larger at approximately 5-12 V at about 500 mA maximum current.

Figure 31:
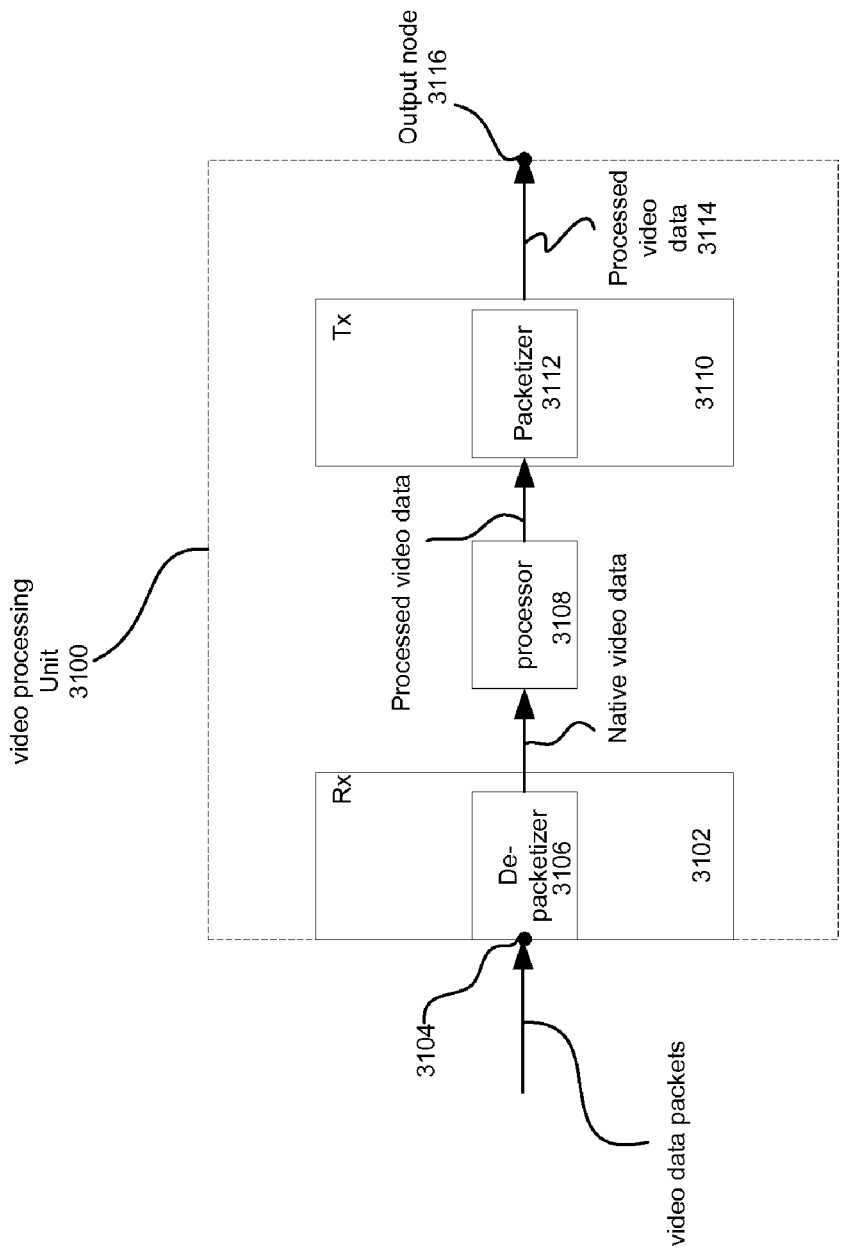
FIG. 31 shows a representative video processing unit in accordance with an embodiment of the invention.

During operation, packetizer 3030 included in transmitter 3032 packetizes native multimedia data 3034 (that can be either analog or digital) generated by and received from, for example, video unit 3036 to form packetized video data stream 3038. In this situation, multimedia source 3002 acts as a master device and display 3004 as the slave device in that it is multimedia source 3002 that initiates any transaction for which display 3004 provides an appropriate response. Video data stream 3038 is then passed by way of transmitter 3032 to video processing unit 3012 for further processing. For example, FIG. 31 shows a representative implementation of video processing unit 3100 in accordance with an embodiment of the invention. The video processing unit 3100 includes a receiver portion 3102 having an input node 3104 suitable for receiving video data packets from packetized video data stream 3038. The received video data packets are, in turn, forwarded to de-packetizer unit 3106 that regenerates the native video data corresponding to native video multimedia data 3034 as input to processor 3108. Processor 3108, in turn, processes the native video data according to pre-selected set of instructions provided by, for example, external memory devices. Processor 3108, in turn, outputs processed video data to transmitter unit 3110 where packetizer 3112 packetizes the processed video data into processed packetized video data stream 3114 that is output to transmitter output node 3116.

Referring back to FIG. 30, once processed video stream 3114 is received at receiver 3038 connected to display side connector 3012, de-packetizer 3040 converts the data packets to video stream 3042 corresponding to a processed version of native video stream 3034 using any number of well known techniques as input to display controller 3044. For example, receiver 3038 can include a time-base recovery (TBR) unit (not shown) that regenerates the native rate of video stream 3034 using time stamps embedded in data packets of video stream 3008. It should be noted, however, that for appropriately configured digital display devices (shown, for example, in FIG. 2C), time base recovery is unnecessary since display data is be sent to the display driver electronics included in display controller 3044 at the link character clock rate, thereby greatly reducing the number of channels required with a commensurate reduction in complexity and cost for the display.

In the case whereby display 3004 is USB (or other similar technology) enabled, system 3000 can be considered operable in what is referred to as a multi-master mode in which either multimedia source 3002 or display 3004 can take on the role of master/slave. For example, in the situation illustrated in FIG. 31, USB enabled multimedia source 3002 (such as a portable digital camera, multimedia player, or a PC having digital photo library management software, for example) includes memory 3046 coupled to multimedia source processor 3048 arranged to receive and respond to data (or file) request 3050 generated by USB enabled display 3004. Upon receipt of data request 3050, processor 3048 responds by generating and forwarding a memory read command 3054 to memory 3046 that responds by forwarding requested data 3056 back to processor 3048 that, in turn, forwards requested data 3056 back to display 3004 by way of bi-directional auxiliary channel 3014. Since bi-directional auxiliary channel 3014 is half duplex in nature, in order to prevent collisions on bi-directional auxiliary channel 3014, arbitration control unit 3058 monitors bus commands generated by display processor 3060 and multimedia source processor 3048. If any collision or potential collision is detected, then arbitration control unit 3058 can give priority to either multimedia source 3002 or display 3004. In the described embodiment, however, multimedia source 3002 is generally given priority over display 3004 by holding any display 3004 requests (using, for example, time stretching techniques available in I2C bus architectures) until such time as bi-directional auxiliary bus 3014 is available.

Once requested data 3056 (in the form of serial bus (USB) data, for example) has been received by receiver 3038, requested data 3056 is forwarded to display processor 3060 where it can be further processed (such as image enhancement, superposition of graphical or textual data, etc.) or not and then forwarded to and stored in memory 3062 for subsequent display on displayer 3064, for example.

Although only a few embodiments of the present invention have been described, it should be understood that the present invention may be embodied in many other specific forms without departing from the spirit or the scope of the present invention. The present examples are to be considered as illustrative and not restrictive, and the invention is not to be limited to the details given herein, but may be modified within the scope of the appended claims along with their full scope of equivalents.

While this invention has been described in terms of a preferred embodiment, there are alterations, permutations, and equivalents that fall within the scope of this invention. It should also be noted that there are many alternative ways of implementing both the process and apparatus of the present invention. It is therefore intended that the invention be interpreted as including all such alterations, permutations, and equivalents as fall within the true spirit and scope of the present invention.

I claim:

1. A multimedia interface, comprising:
a receiver unit arranged to receive video data packets at a link character clock rate, eliminating the need for time base recovery on the video data packets, wherein the video data packets correspond to a native video data stream at a native video clock rate and neither a transmitted clock signal nor time stamps are utilized at the receiver unit;
a video enhancement unit coupled to the receiver unit arranged to process the received video data packets; and
a transmitter unit arranged to transmit the processed video packets at the link character clock rate, wherein the link character clock rate is independent of the native video clock rate;
wherein the video enhancement unit is included in a connector of a cable assembly configured to electrically connect a multimedia source and a multimedia sink with the video data packets processed by the video enhancement unit within the connector being passed on to the multimedia sink.

2. An interface as recited in claim 1, wherein the receiver unit comprises:
a regenerator unit arranged to convert the received video data packets to video data suitable for processing by the video enhancement unit.

3. An interface as recited in claim 2, wherein the video data suitable for processing by the video enhancement unit is a native video data.

4. An interface as recited in claim 3, wherein the video enhancement unit comprises:
an input node coupled to the regenerator unit arranged to receive the native video data; and
a video processor arrange to process the received native video according to video processing instructions.

5. An interface as recited in claim 3, wherein the transmitter unit comprises:
a transmitter input node arranged to receive the processed video data;
a generator unit arranged to convert the received processed video data into video data packets corresponding to the processed video data; and
a transmitter output node arranged to provide the video packets corresponding to the processed video data to external circuitry.

6. An interface as recited in claim 5, wherein a receiver input node is connected to a multimedia source device and wherein the transmitter output node is connected to a communication link.

7. An interface as recited in claim 6, wherein the receiver input node is connected to a communication link and wherein a transmitter output node is connected to a multimedia sink device.

8. An interface as recited in claim 7, wherein the communication link comprises:
a uni-directional main link having multiple lanes coupling the multimedia source to the multimedia sink arranged to carry the processed packetized video data packets from the transmitter output node to the multimedia sink at the link character clock rate;
a half duplex, bi-directional auxiliary channel connecting the multimedia source and the display that provides in concert with the uni-directional main link, a secondary communication link between the multimedia source and the display for transferring information between the multimedia source and the multimedia sink.

9. An interface as recited in claim 1, wherein the processing includes contrast enhancement.

10. An interface as recited in claim 1, further comprising:
a hot plug event detector unit arranged to automatically determine when an active sink device is connected to the receiver unit.

11. A cable assembly, comprising:
a uni-directional main link coupling a multimedia source to a multimedia sink arranged to carry a packetized multimedia data stream from the multimedia source to a multimedia display at a link character clock rate that is independent of a native multimedia clock rate, eliminating the need for time based recovery of the packetized multimedia data stream and neither a transmitted clock signal nor time stamps are utilized at the multimedia display;
a half duplex, bi-directional auxiliary channel connecting the multimedia source and the display that provides in concert with the uni-directional main link, a secondary communication link between the multimedia source and the display for transferring information between the multimedia source and the display, and
a connector arrangement arranged to electrically connect the uni-directional main link and the half duplex, bi-directional auxiliary channel to the multimedia source and the display comprising:
a video processing unit included in a connector of the connector arrangement, the video processing unit arranged to process video data received from the multimedia source and pass the processed video data to the display by way of the main link.

12. A cable assembly as recited in claim 11, wherein the multimedia data stream has an associated adjustable data stream link rate that is independent of the native stream rate.

13. A cable assembly as recited in claim 11, wherein the multimedia data stream is an isochronous and wherein the information transfer is an asynchronous.

14. A cable assembly as recited in claim 11, further comprising:
a hot plug event detector unit arranged to automatically determine when an active sink device is connected to the cable assembly.

15. A cable assembly as recited in claim 11, wherein the information carried by the auxiliary channel includes sync loss information, dropped packets information and the results of training session information.

16. A cable assembly as recited in claim 11, wherein the link rate is adjustable up to about 2.7 Gbps and an associated bandwidth of 270 Mbytes/sec.

17. A cable assembly as recited in claim 15, wherein the multimedia source informs the display device by way of the auxiliary channel of an audio sample rate and a number of bits per sample corresponding to an audio stream.

18. A cable assembly as recited in claim 11, wherein the auxiliary channel supports data transmission rates up to at least 480 Mbs between the multimedia source and the multimedia display using a self-clocked data signal.

19. A cable assembly as recited in claim 18, wherein when the interface is placed in a multi-master mode, either the multimedia source or the display can be a master device, and wherein serial data in response is passed from a responding slave device in response to a requesting master device over the auxiliary channel.

20. A cable assembly as recited in claim 19, further comprising:
an arbitration unit arranged to monitor auxiliary channel requests and provide for a priority of any conflicting requests.

21. A system, comprising:
a multimedia interface arranged to couple a multimedia source via a communication link to a multimedia display by carrying video packets at a link character lock rate, eliminating the need for time base recovery of the video packets and neither a transmitted clock signal nor time stamps are utilized at the multimedia display, comprising:
a cable assembly associated with the communication link of the multimedia interface, the electrical connector arrangement having a source side connector and a display side connector;
a video processor unit included in at least one of the source side connector and the display side connector to process video data received from the multimedia source and pass the processed video data to the multimedia display.

* * * * *